United States Patent
Nelson et al.

(10) Patent No.: US 11,195,334 B2
(45) Date of Patent: Dec. 7, 2021

(54) PROVIDING INTERACTIVE VIRTUAL ELEMENTS WITHIN A MIXED REALITY SCENE

(71) Applicant: IGT, Las Vegas, NV (US)

(72) Inventors: Dwayne Nelson, Las Vegas, NV (US); Patrick Danielson, Las Vegas, NV (US)

(73) Assignee: IGT, Las Vegas, NV (US)

(*) Notice: Subject to any disclaimer, the term of this patent is extended or adjusted under 35 U.S.C. 154(b) by 0 days.

(21) Appl. No.: 16/054,247

(22) Filed: Aug. 3, 2018

(65) Prior Publication Data

US 2020/0043233 A1 Feb. 6, 2020

(51) Int. Cl.
| | |
|---|---|
| G06T 19/00 | (2011.01) |
| G06T 19/20 | (2011.01) |
| G06F 3/01 | (2006.01) |
| G07F 17/32 | (2006.01) |
| G07F 17/34 | (2006.01) |

(52) U.S. Cl.
CPC ............ *G06T 19/006* (2013.01); *G06F 3/011* (2013.01); *G06F 3/016* (2013.01); *G06T 19/20* (2013.01); *G07F 17/3209* (2013.01); *G07F 17/34* (2013.01)

(58) Field of Classification Search
CPC ....... G06T 19/006; G06T 19/20; G06F 3/016; G06F 3/011; G07F 17/34; G07F 17/3209; G07F 17/3204; G07F 17/3211; G07F 17/3239; A63F 13/212; A63F 13/25

USPC ......................................................... 345/633
See application file for complete search history.

(56) References Cited

U.S. PATENT DOCUMENTS

| | | | |
|---|---|---|---|
| 8,235,529 B1 | 8/2012 | Raffle et al. | |
| 8,558,759 B1 | 10/2013 | Prada et al. | |
| 8,821,274 B2 | 9/2014 | Lyons et al. | |
| 8,943,420 B2 | 1/2015 | Goldthwaite et al. | |
| 9,280,867 B2 | 3/2016 | Froy et al. | |
| 9,280,868 B2 | 3/2016 | Froy et al. | |
| 9,285,592 B2 | 3/2016 | Olsson et al. | |
| 9,412,201 B2 | 8/2016 | Kinnebrew et al. | |
| 9,558,612 B2 | 1/2017 | Lyons et al. | |
| 9,568,620 B2 | 1/2017 | Froy et al. | |
| 9,569,920 B2 | 2/2017 | Froy et al. | |
| 2004/0009806 A1* | 1/2004 | Odom ..................... | A63F 3/062 463/19 |
| 2005/0032564 A1* | 2/2005 | Sines ................... | A63F 3/00157 463/13 |
| 2006/0084505 A1* | 4/2006 | Yoseloff ................. | G07F 17/32 463/42 |

(Continued)

*Primary Examiner* — Jennifer Mehmood
*Assistant Examiner* — Kim Thanh T Tran
(74) *Attorney, Agent, or Firm* — Sage Patent Group

(57) ABSTRACT

A live video signal of a scene associated with a field of view of a user may be generated. The scene may include a casino gaming floor that includes multiple wagering stations. A location in the scene and a virtual element may be determined, based on the live video signal of the scene. The virtual element may be displayed to the user in the location in the scene so that the virtual element is in the field of view of the user using an augmented reality (AR) device. An user input that corresponds to the virtual element may be received and an action of the virtual element responsive to receiving the user input may be generated.

20 Claims, 16 Drawing Sheets

(56) References Cited

U.S. PATENT DOCUMENTS

| | | | |
|---|---|---|---|
| 2007/0066387 A1* | 3/2007 | Matsuno | G07F 17/32 463/25 |
| 2008/0113738 A1* | 5/2008 | Vallejo | G07F 17/3244 463/20 |
| 2008/0119261 A1* | 5/2008 | Heymann | G07F 17/32 463/20 |
| 2010/0029381 A1* | 2/2010 | Vancura | G07F 17/3244 463/30 |
| 2012/0327116 A1* | 12/2012 | Liu | G09G 5/377 345/633 |
| 2014/0002442 A1* | 1/2014 | Lamb | G06F 3/1431 345/419 |
| 2014/0080590 A1* | 3/2014 | Link | G07F 17/3255 463/27 |
| 2014/0106876 A1* | 4/2014 | Knutsson | A63B 71/06 463/31 |
| 2014/0121015 A1* | 5/2014 | Massing | G07F 17/3211 463/33 |
| 2014/0168261 A1 | 6/2014 | Margolis et al. | |
| 2015/0062163 A1* | 3/2015 | Lee | G09G 3/003 345/633 |
| 2016/0373570 A1 | 12/2016 | Scavezze et al. | |

* cited by examiner

PROVIDING INTERACTIVE VIRTUAL ELEMENTS WITHIN A MIXED REALITY SCENE

BACKGROUND

Embodiments described herein relate to mixed reality systems and methods, and in particular to systems and methods for providing interactive virtual elements within a mixed reality scene.

Electronic and electro-mechanical gaming machines (EGMs) are systems that allow users to place a wager on the outcome of a random event, such as the spinning of mechanical or virtual reels or wheels, the playing of virtual cards, the rolling of mechanical or virtual dice, the random placement of tiles on a screen, etc. Manufacturers of EGMs have incorporated a number of enhancements to the EGMs to allow players to interact with the EGMs in new and more engaging ways. For example, early slot machines allowed player interaction by pulling a lever or arm on the machine. As mechanical slot machines were replaced by electronic slot machines, a range of new player interface devices became available to EGM designers and were subsequently incorporated into EGMs. Examples of such interface devices include electronic buttons, wheels, and, more recently, touchscreens and three-dimensional display screens. Player attraction to EGMs may be improved by implementing a variety of interface devices.

BRIEF SUMMARY

A live video signal of a scene associated with a field of view of a user may be received. The scene may include a casino gaming floor that includes multiple wagering stations. A location in the scene and a virtual element may be determined, based on the live video signal of the scene. The virtual element may be displayed to the user in the location in the scene so that the virtual element is in the field of view of the user using an augmented reality (AR) device. A user input that corresponds to the virtual element may be received and an action of the virtual element responsive to receiving the user input may be generated.

An augmented reality (AR) system includes an augmented reality (AR) server. The AR server receives a live video signal of a scene associated with fields of view of users. The scene includes a casino gaming floor that includes multiple wagering stations. The AR server determines a location in the scene and sends AR display data to multiple AR devices that each generate AR display content that is viewable by multiple respective users of the AR devices. The AR display content includes AR image content and AR location data. Each of the AR devices includes a processing circuit, a transceiver coupled to the processing circuit, and a display device that is coupled to the processing circuit and configured to display the AR display content within a field of view of the respective user when the respective user is viewing the location. The AR display content includes multiple virtual elements that are displayed as being at respective locations of the casino gaming floor. The AR server receives, via one of the AR devices, a user input from one of the users that corresponds to one of the virtual elements and that generates an action of the virtual element responsive to receiving the user input. Different virtual elements are associated with different player awards.

BRIEF DESCRIPTION OF THE SEVERABLE VIEWS OF THE DRAWINGS

DETAILED DESCRIPTION

Embodiments described herein relate to mixed reality systems and methods, and in particular to systems and methods for providing interactive virtual elements within a mixed reality scene. According to some embodiments, a method is disclosed. The method includes receiving a live video signal of a scene associated with a field of view of a user. The scene may include a casino gaming floor that includes multiple wagering stations. A location in the scene is determined and, based on the live video signal of the scene, a virtual element is determined. The virtual element is displayed to the user using an augmented reality (AR) device and is located in the location in the scene so that the virtual element is in the field of view of the user.

The virtual element may include a variety of different images and/or image types. A user input that corresponds to the virtual element is received. For example, the user input may be used to select and/or interact with the virtual element. An action of the virtual element is generated and displayed in response to the user input selecting the virtual element. Some embodiments provide that the action includes causing the virtual element to transform to another virtual element in an animated transition. One example, may include a virtual element that explodes and then displays an award value that corresponds to the virtual element. Awards may include money, bonus points, virtual currency, tickets to other attractions, and/or wagering credits, among others.

In some embodiments, the virtual element may include multiple virtual elements that are visible at a variety of locations around the casino. For example, virtual elements may be used to attract attention to specific games or other features in the casino. Some embodiments provide that a user is led over a specific route by sequentially placing the virtual elements along the intended route. For example, responsive to a user selecting a first virtual element, a next virtual element may be displayed at a next waypoint along the route.

In some embodiments, an award is provided to a user that selects the virtual elements in a given order, which may be identified by a numerical order, alpha order, shape order and/or size order.

Figure 1:
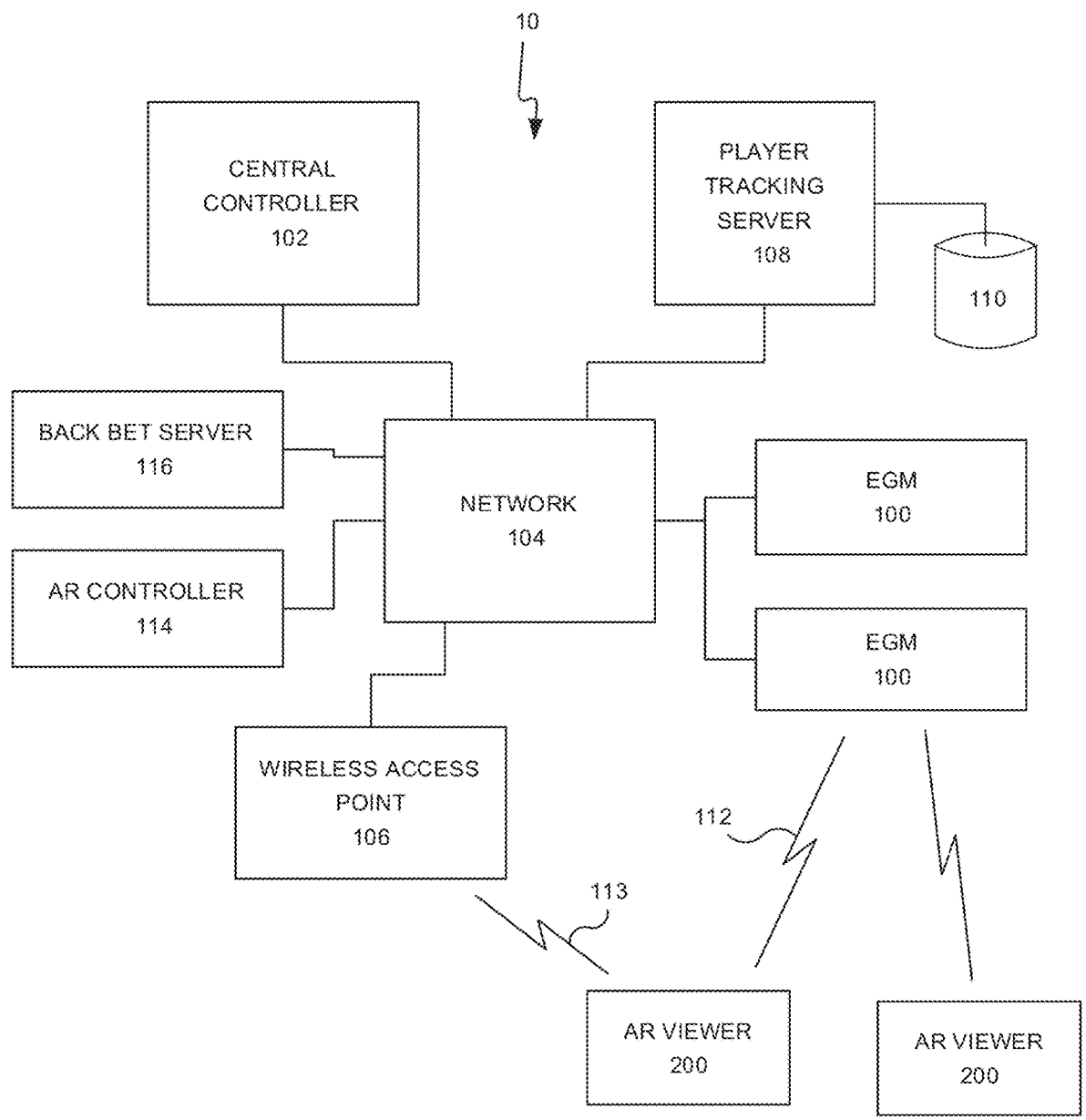
FIG. 1 is a schematic block diagram illustrating a network configuration for a plurality of gaming devices according to some embodiments.

Referring to FIG. 1, a gaming system 10 including a plurality of EGMs 100 is illustrated. The gaming system 10 may be located, for example, on the premises of a gaming establishment, such as a casino. The EGMs 100, which are typically situated on a casino floor, may be in communication with each other and/or at least one central controller 102 through a data network or remote communication link 104. The data communication network 104 may be a private data communication network that is operated, for example, by the gaming facility that operates the EGM 100. Communications over the data communication network 104 may be encrypted for security. The central controller 102 may be any suitable server or computing device which includes at least one processor and at least one memory or storage device. Each EGM 100 may include a processor that transmits and receives events, messages, commands or any other suitable data or signal between the EGM 100 and the central controller 102. The EGM processor is operable to execute such communicated events, messages or commands in conjunction with the operation of the EGM. Moreover, the processor of the central controller 102 is configured to transmit and receive events, messages, commands or any other suitable data or signal between the central controller 102 and each of the individual EGMs 100. In some embodiments, one or more of the functions of the central controller 102 may be performed by one or more EGM processors. Moreover, in some embodiments, one or more of the functions of one or more EGM processors as disclosed herein may be performed by the central controller 102.

A wireless access point 106 provides wireless access to the data communication network 104. The wireless access point 106 may be connected to the data communication network 104 as illustrated in FIG. 1, or may be connected directly to the central controller 102 or another server connected to the data communication network 104.

A player tracking server 108 may also be connected through the data communication network 104. The player tracking server 108 may manage a player tracking account that tracks the player's gameplay and spending and/or other player preferences and customizations, manages loyalty awards for the player, manages funds deposited or advanced on behalf of the player, and other functions. Player information managed by the player tracking server 108 may be stored in a player information database 110.

As further illustrated in FIG. 1, a mixed reality viewer 200, or augmented reality (AR) viewer 200, is provided. The mixed reality viewer 200 communicates with one or more elements of the system 10 to render two-dimensional (2D) and/or three-dimensional (3D) content to a player of one of the EGMs 100 in a virtual space, while at the same time allowing the player to see objects in the real space around the player. That is, the mixed reality viewer 200 combines a virtual image with real images perceived by the user, including images of real objects as well as images displayed by the EGM 100. In this manner, the mixed reality viewer 200 "mixes" real and virtual reality into a single viewing experience for the player. In some embodiments, the mixed reality viewer 200 may be further configured to enable the player to interact with both the real and virtual objects displayed to the player by the mixed reality viewer 200.

The mixed reality viewer 200 communicates with one or more elements of the system 10 to coordinate the rendering of mixed reality images, and in some embodiments mixed reality 3D images, to the player. For example, in some embodiments, the mixed reality viewer 200 may communicate directly with an EGM 100 over a wireless interface 112, which may be a WiFi link, a Bluetooth link, an NFC link, etc. In other embodiments, the mixed reality viewer 200 may communicate with the data communication network 104 (and devices connected thereto, including EGMs) over a wireless interface 113 with the wireless access point 106. The wireless interface 113 may include a WiFi link, a Bluetooth link, an NFC link, etc. In still further embodiments, the mixed reality viewer 200 may communicate simultaneously with both the EGM 100 over the wireless interface 112 and the wireless access point 106 over the wireless interface 113. In these embodiments, the wireless interface 112 and the wireless interface 113 may use different communication protocols and/or different communication resources, such as different frequencies, time slots, spreading codes, etc. For example, in some embodiments, the wireless interface 112 may be a Bluetooth link, while the wireless interface 113 may be a WiFi link.

The wireless interfaces 112, 113 allow the mixed reality viewer 200 to coordinate the generation and rendering of mixed reality images to the player via the mixed reality viewer 200.

In some embodiments, the gaming system 10 includes a mixed reality controller, or AR controller 114. The AR controller 114 may be a computing system that communicates through the data communication network 104 with the EGMs 100 and the mixed reality viewers 200 to coordinate the generation and rendering of virtual images to one or more players using the mixed reality viewers 200. The AR controller 114 may be implemented within or separately from the central controller 102.

In some embodiments, the AR controller 114 may coordinate the generation and display of the virtual images of the same virtual object to more than one player by more than one mixed reality viewer 200. As described in more detail below, this may enable multiple players to interact with the same virtual object together in real time. This feature can be used to provide a shared multiplayer experience to multiple players at the same time.

Moreover, in some embodiments, the AR controller 114 may coordinate the generation and display of the same virtual object to players at different physical locations, as will be described in more detail below.

The AR controller 114 may store a three-dimensional wireframe map of a gaming area, such as a casino floor, and may provide the three-dimensional wireframe map to the mixed reality viewers 200. The wireframe map may store various information about EGMs in the gaming area, such as the identity, type and location of various types of EGMs. The three-dimensional wireframe map may enable a mixed reality viewer 200 to more quickly and accurately determine its position and/or orientation within the gaming area, and also may enable the mixed reality viewer 200 to assist the player in navigating the gaming area while using the mixed reality viewer 200. The generation of three-dimensional wireframe maps is described in more detail below.

In some embodiments, at least some processing of virtual images and/or objects that are rendered by the mixed reality viewers 200 may be performed by the AR controller 114, thereby offloading at least some processing requirements from the mixed reality viewers 200.

A back bet server 116 may be provided to manage back bets placed using a mixed reality viewer 200 as described in more detail below. A mixed reality viewer 200 may communicate with the back bet server 116 through the wireless interface 113 and network 104.

Referring to FIGS. 2A to 2D, the mixed reality viewer 200 may be implemented in a number of different ways. For example, referring to FIG. 2A. in some embodiments, a mixed reality viewer 200A may be implemented as a 3D headset including a pair of semitransparent lenses 218 on which images of virtual objects may be displayed. Different stereoscopic images may be displayed on the lenses 218 to create an appearance of depth, while the semitransparent nature of the lenses 218 allow the user to see both the real world as well as the 3D image rendered on the lenses 218. The mixed reality viewer 200A may be implemented, for example, using a Hololens™ from Microsoft Corporation. The Microsoft Hololens includes a plurality of cameras and other sensors 220 that the device uses to obtain a live video signal for building a 3D model of the space around the user. The device 200A can generate a 3D image to display to the user that takes into account the real world objects around the user and allows the user to interact with the 3D object.

The device 200A may further include other sensors, such as a gyroscopic sensor, a GPS sensor, one or more accelerometers, and/or other sensors that allow the device 200A to determine its position and orientation in space. In further embodiments, the device 200A may include one or more cameras that allow the device 200A to determine its position and/or orientation in space using visual simultaneous localization and mapping (VSLAM). The device 200A may further include one or more microphones and/or speakers that allow the user to interact audially with the device.

Figure 2A:
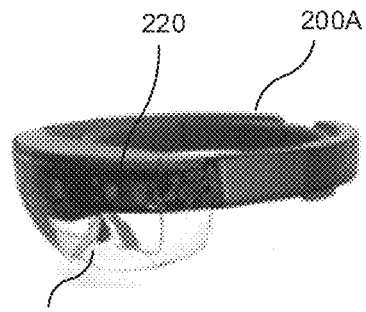
FIGS. 2A to 2D illustrate mixed reality viewers according to various embodiments.
Figure 2B:
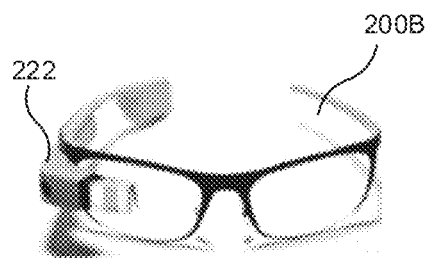

Referring to FIG. 2B, a mixed reality viewer 200B may be implemented as a pair of glasses 200B including a transparent prismatic display 222 that displays an image to a single eye of the user. An example of such a device is the Google Glass device. Such a device may be capable of displaying images to the user while allowing the user to see the world around the user, and as such can be used as a mixed reality viewer. However, it will be appreciated that the device 200B may be incapable of displaying 3D images to the user.

Figure 2C:
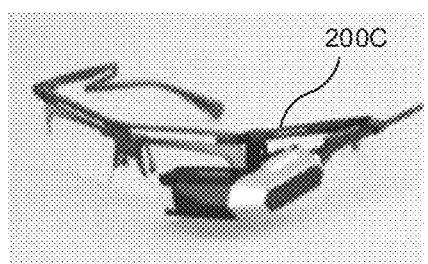
Figure 2D:
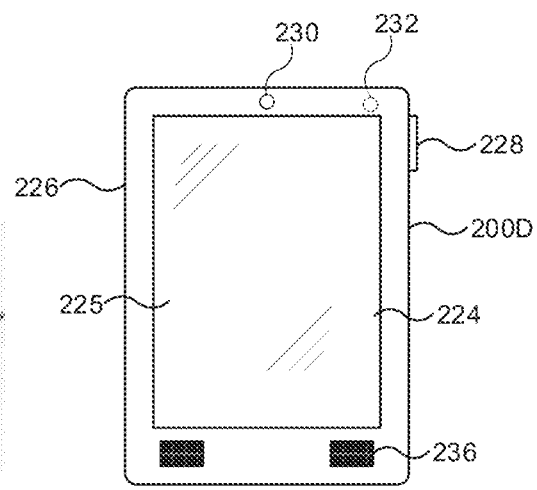

In other embodiments, referring to FIG. 2C, the mixed reality viewer may be implemented using a virtual retinal display device 200C. In contrast to devices that display an image within the field of view of the user, a virtual retinal display raster scans an image directly onto the retina of the user Like the device 200B, the virtual retinal display device 200C combines the displayed image with surrounding light to allow the user to see both the real world and the displayed image. However, also like the device 200B, the virtual retinal display device 200C may be incapable of displaying 3D images to the user.

In still further embodiments, a mixed reality viewer 200D may be implemented using a mobile wireless device, such as a mobile telephone, a tablet computing device, a personal digital assistant, or the like. The device 200D may be a handheld device including a housing 226 on which a touchscreen display device 224 including a digitizer 225 is provided. An input button 228 may be provided on the housing and may act as a power or control button. A rear facing camera 230 may be provided in a front face of the housing 226. The device 200D may further include a front facing camera 232 on a rear face of the housing 226. The device 200D may include one or more speakers 236 and a microphone 234. The device 200D may provide a mixed reality display by capturing a video signal using the front facing camera 232 and displaying the video signal on the display device 224, and also displaying a rendered image of a virtual object over the captured video signal. In this manner, the user may see both a mixed image of both a real object in front of the device 200D as well as a virtual object superimposed over the real object to provide a mixed reality viewing experience.

Figure 3A:
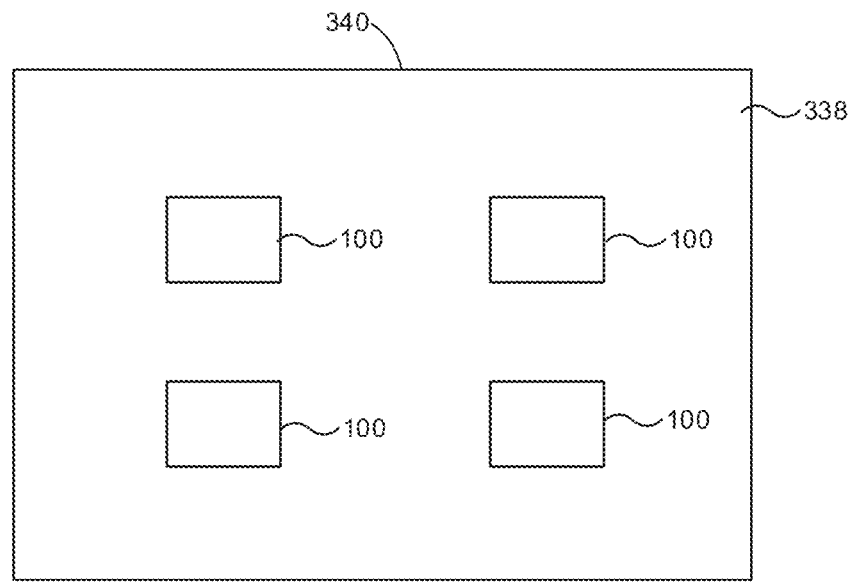
FIG. 3A is a map of a gaming area, such as a casino floor.

FIG. 3A illustrates, in plan view, an example map 338 of a gaming area 340. The gaming area 340 may, for example, be a casino floor. The map 338 shows the location of a plurality of EGMs 100 within the gaming area 340, but it should be understood that the map 338 may correspond to any representative area, including areas in and around a casino property, or outdoor areas in a city or town where the casino is located, for example. As noted above, in order to assist the operation of the mixed reality viewers 200, the AR controller 114 may store a three-dimensional wireframe map of the gaming area 340 or other area, and may provide the three-dimensional wireframe map to the mixed reality viewers 200. In some embodiments, the three-dimensional wireframe may be generated dynamically based on data received as the mixed reality viewer scans the surrounding environment, such as a casino floor, for example.

Figure 3B:
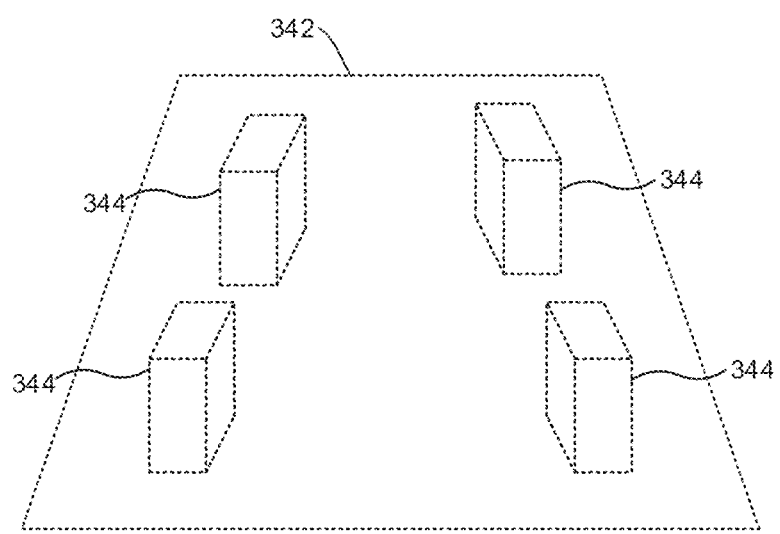
FIG. 3B is a 3D wireframe model of the gaming area of FIG. 3A.

An example of a wireframe map 342 is shown in FIG. 3B. The wireframe map 342 is a three-dimensional model of the gaming area 340. As shown in FIG. 3B, the wireframe map 342 includes wireframe models 344 corresponding to the EGMs 100 or other devices, fixtures, or architectural features that are physically in the gaming area 340 or other area. The wireframe models 344 may be pregenerated to correspond to various form factors. The pregenerated models may then be placed into the wireframe map, for example, by a designer or other personnel. The wireframe map 342 may be updated whenever the physical location of EGMs or other devices or fixtures in the gaming area 340 or other area are changed.

In some embodiments, the wireframe map 342 may be generated automatically using a mixed reality viewer 200, such as a 3D headset, that is configured to perform a three-dimensional depth scan of its surroundings and generate a three-dimensional model based on the scan results. Thus, for example, an operator using a mixed reality viewer 200A (FIG. 2A) may perform a walkthrough of the gaming area 340 or other area while the mixed reality viewer 200A builds the 3D map of the area.

The three-dimensional wireframe map 342 may enable a mixed reality viewer 200 to more quickly and accurately determine its position and/or orientation within the gaming area 340 or other area. For example, a mixed reality viewer 200 may determine its location within the gaming area 340 or other area using one or more position/orientation sensors. The mixed reality viewer 200 then builds a three-dimensional map of its surroundings using depth scanning, and compares its sensed location relative to objects within the generated three-dimensional map with an expected location based on the location of corresponding objects within the wireframe map 342. The mixed reality viewer 200 may calibrate or refine its position/orientation determination by comparing the sensed position of objects with the expected position of objects based on the wireframe map 342. Moreover, because the mixed reality viewer 200 has access to the wireframe map 342 of the entire gaming area 340 or other area, the mixed reality viewer 200 can be aware of objects or destinations within the gaming area 340 or other area that it has not itself scanned. Processing requirements on the mixed reality viewer 200 may also be reduced because the wireframe map 342 is already available to the mixed reality viewer 200.

In some embodiments, the wireframe map 342 may store various information about EGMs in the gaming area 340 or other area, such as the identity, type, orientation and location of various types of EGMs, the locations of exits, bathrooms, courtesy desks, cashiers, ATMs, ticket redemption machines, etc., for example. Such information may be used by a mixed reality viewer 200 to help the user navigate the gaming area 340 or other area. For example, if a user desires to find a destination within the gaming area, the user may ask the mixed reality viewer 200 for directions using a built-in microphone and voice recognition function in the mixed reality viewer 200 or use other hand gestures or eye/gaze controls tracked by the mixed reality viewer 200 (instead of or in addition to voice control). The mixed reality viewer 200 may process the request to identify the destination, and then may display a virtual object, such as a virtual path on the ground, virtual arrow, virtual sign, etc., to help the user to find the destination. In some embodiments, for example, the mixed reality viewer 200 may display a halo or glow around the destination to highlight it for the user, or have virtual 3D sounds coming from it so players could more easily find the machine.

According to some embodiments, a user of a mixed reality viewer 200 may use the mixed reality viewer 200 to obtain information about players and/or EGMs on a casino gaming floor. The information may be displayed to the user on the mixed reality viewer 200 in a number of different ways such as by displaying images on the mixed reality viewer 200 that appear to be three dimensional or two-dimensional elements of the scene as viewed through the mixed reality viewer 200. In general, the type and/or amount of data that is displayed to the user may depend on what type of user is using the mixed reality viewer 200 and, correspondingly, what level of permissions or access the user has.

Figure 4:
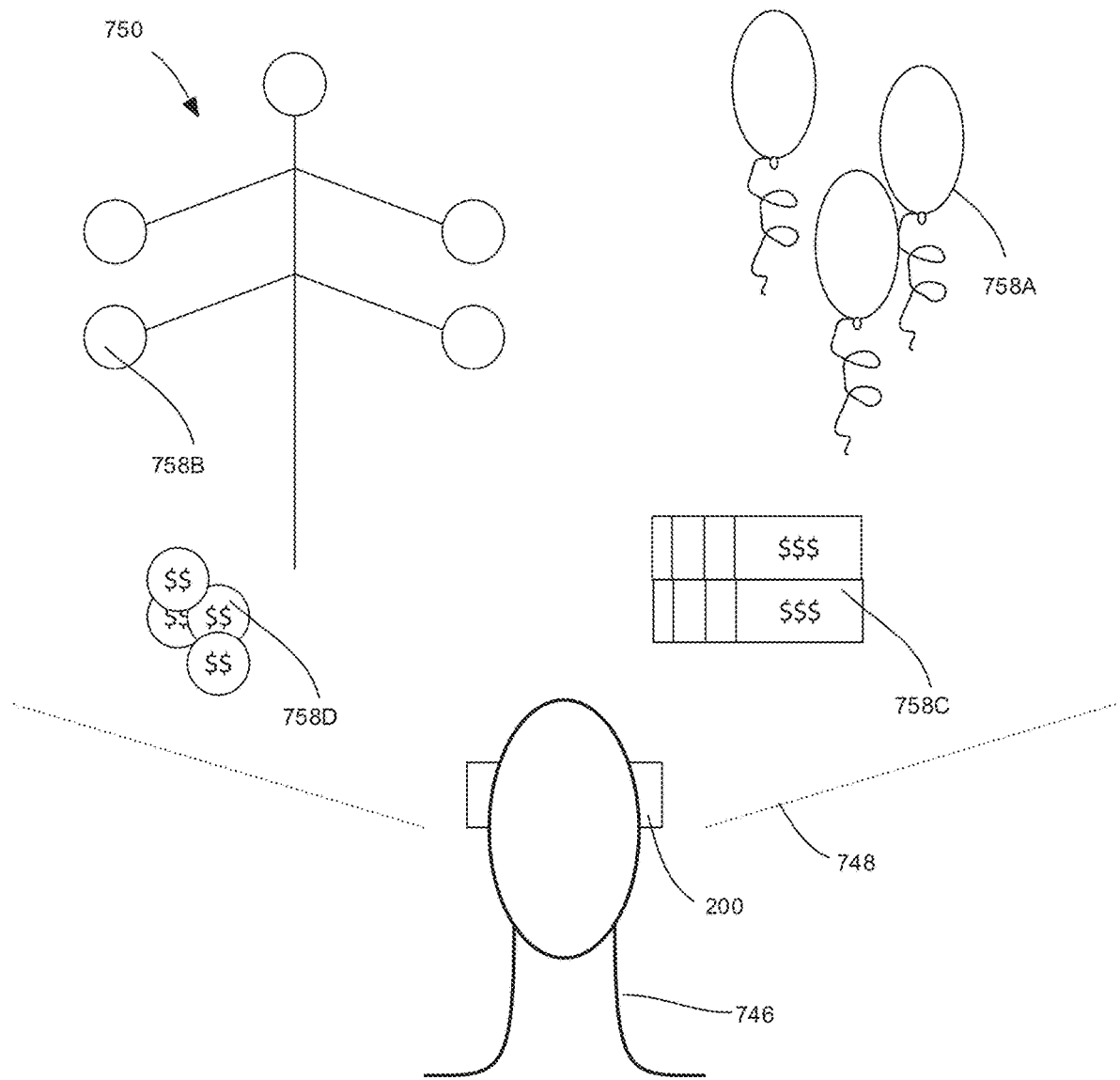
FIG. 4 illustrates a mixed reality interface with a scene including virtual elements according to some embodiments.

In an example, FIG. 4 illustrates a mixed reality interface 750 with a scene 748 including virtual elements 758 that are visible to a user 746 viewing the scene 748 via an AR device 200 according to some embodiments. In this example, based on the location of the user 746, different virtual elements 758 may be displayed using the AR device 200. Virtual elements 758 may include any of one or more of a variety of types of images that may be displayed to the user 746. For example, virtual elements 758A may include images of one or more balloons that may be displayed corresponding to specific locations in the scene 748 as part of the mixed reality interface 750. Some embodiments provide that the virtual elements 758B may include images of fruit hanging on a fruit tree. In some embodiments, the virtual elements 758C may include representations of currency including one or more images of individual currency bills and/or stacks of currency bills. Similarly, the virtual elements 758D may include one or more images of valuable articles such as precious metal coins (e.g., gold, silver, platinum, copper, or bronze) or precious gems (e.g., diamond, rubies, etc.).

Figure 5A:
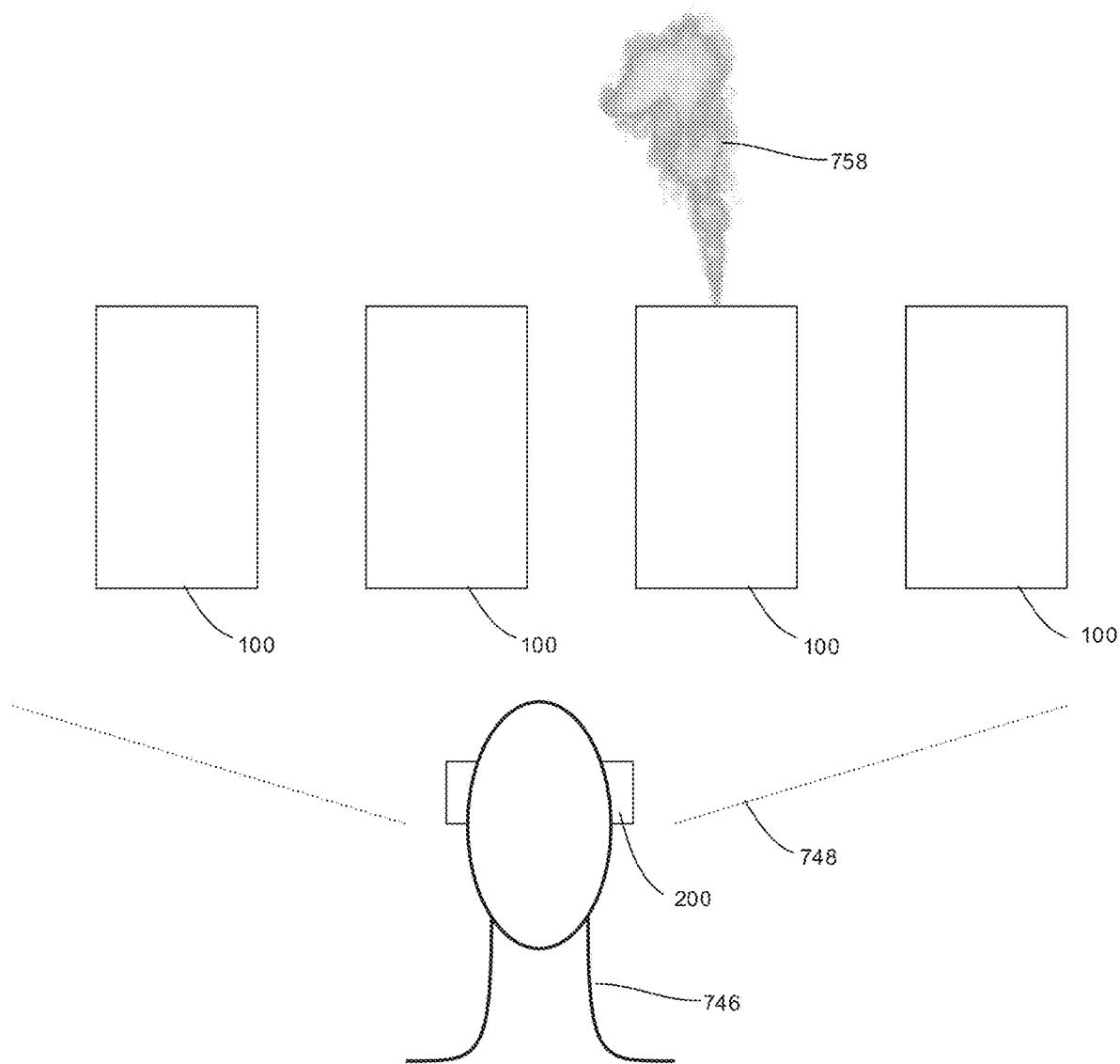
FIGS. 5A and 5B are schematic diagrams that illustrate a mixed reality interface that includes virtual elements located at wagering stations according to some embodiments.
Figure 5B:
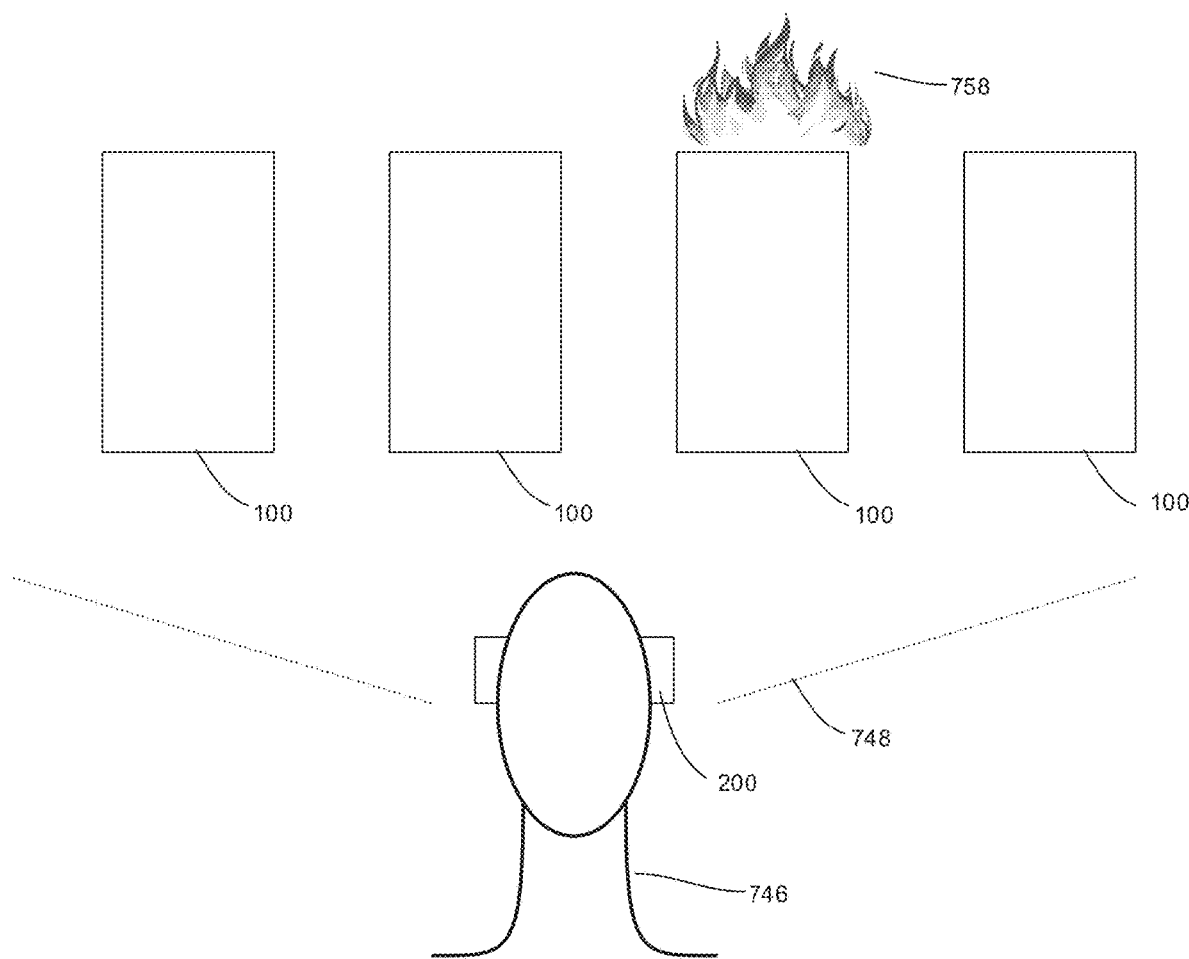

In some embodiments, the virtual element 758 may correspond to a location of a specific wagering station. Reference is now made to FIGS. 5A and 5B, which are schematic diagrams that illustrate a mixed reality interface that includes virtual elements located at wagering stations according to some embodiments. Referring to FIG. 5A, a wagering station may be an EGM 100 that is identified as being attractive to a user by the location of the virtual element 758. For example, the virtual element 758 may include smoke that may lead the user 746 to conclude that the particular EGM 100 is getting "hot" or ready to payout or that a bonus or progressive award is available or increasing. In such embodiments, the user input may be received based on the user 746 initiating game play at the wagering station.

Although illustrated as multiple EGMs 100, the wagering stations may include electronic game tables, conventional game tables including those involving cards, dice and/or roulette, and/or other wagering stations such as sports book stations, video poker games, skill-based games, virtual casino-style table games, or other casino or non-casino style games. In some embodiments, the virtual element 758 may change to another image if the user 746 does not respond to an earlier version of the virtual element 758. For example, reference is now made to FIG. 5B in which the virtual element 758 has changed from the earlier presentation of smoke to a fire image, further communicating that the particular EGM 100 is getting "hot" or ready to payout or that a bonus or progressive award is available and/or increasing.

Figure 6A:
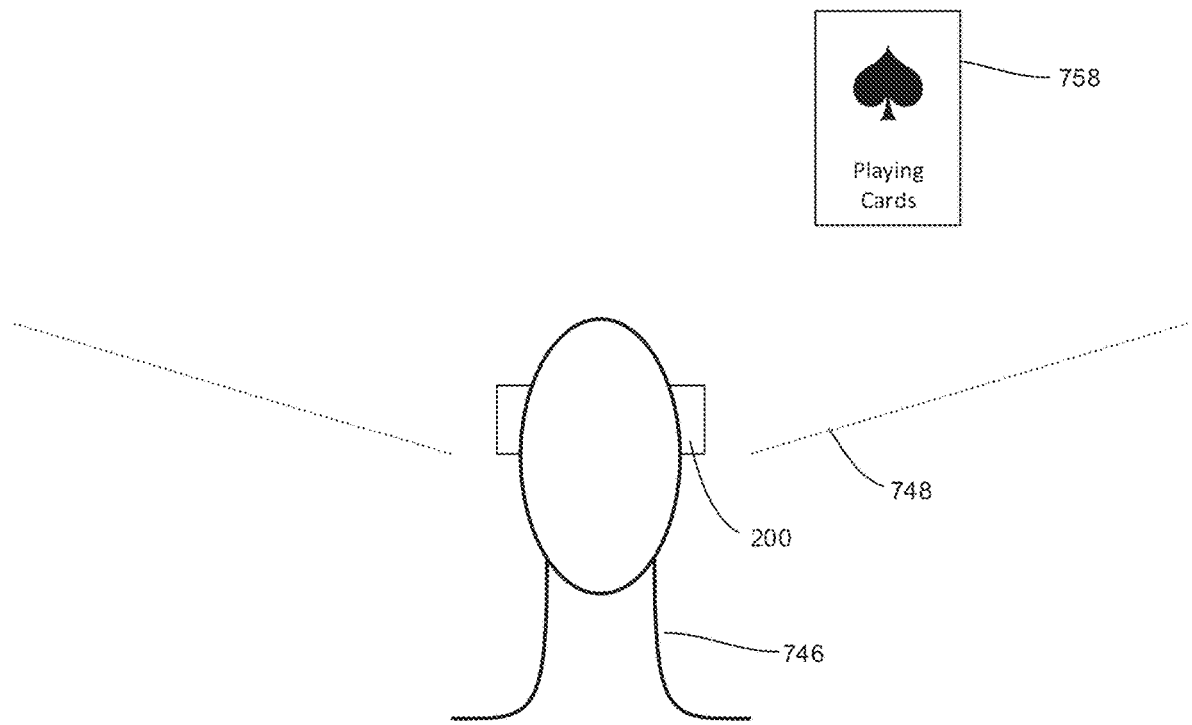
FIGS. 6A and 6B are schematic diagrams that illustrate a mixed reality interface that includes virtual elements as game elements according to some embodiments.
Figure 6B:
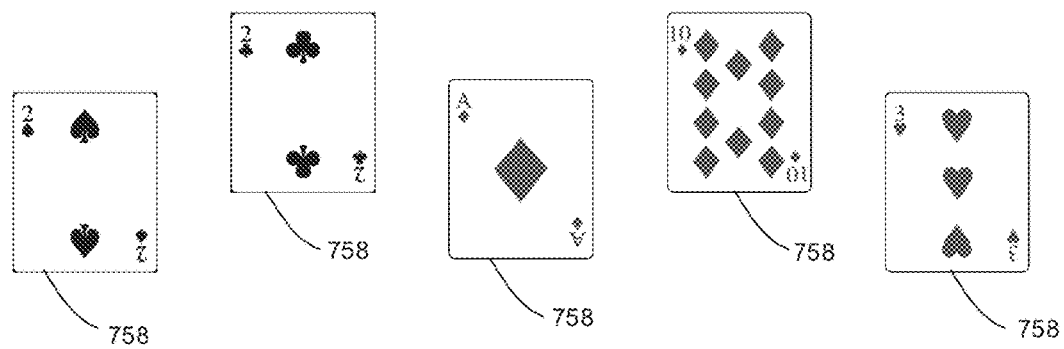

Some embodiments provide that the virtual element 758 comprises a game element and/or collection thereof. For example, brief reference is made to FIGS. 6A and 6B, which are schematic diagrams that illustrate a mixed reality interface that includes virtual elements as game elements according to some embodiments. Referring to FIG. 6A, the virtual element 758 may include a deck of cards that the user may select to receive a hand in a virtual card game. For example, if the user 746 selects the virtual element 758 that is the deck of cards, the action of the virtual element may be to explode into multiple different playing cards. Referring to FIG. 6B, the virtual element 758 may be generated from the original deck of cards that were previously displayed. In such embodiments, an additional user input may be received to select which cards to turn in for new cards to improve the hand of the virtual card game.

Figure 7:
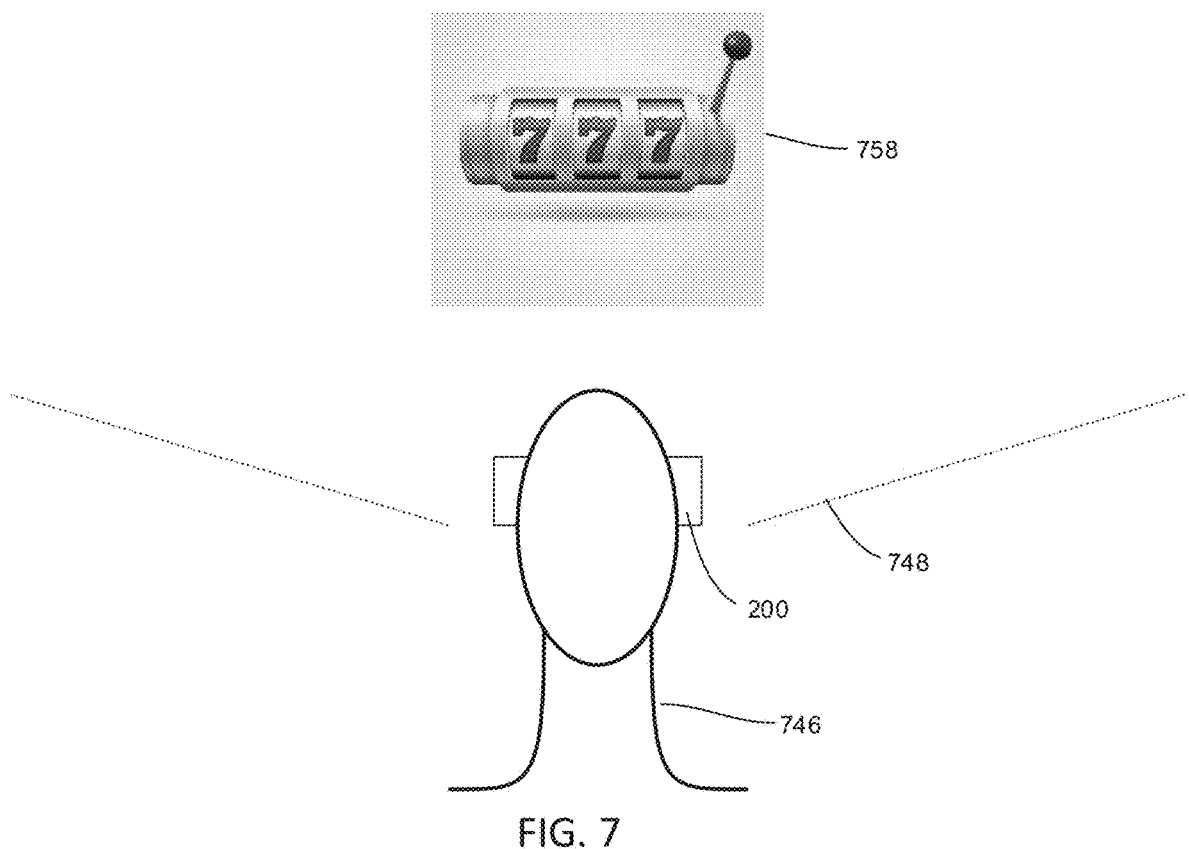
FIG. 7 is a schematic diagram that illustrates a mixed reality interface that includes a virtual element as game elements according to some embodiments.

Reference is made to FIG. 7, which is a schematic diagram that illustrates a mixed reality interface that includes a virtual element as game elements according to some embodiments. As illustrated, the virtual element 758 may include portions of a slot machine. An action in response to a user input may cause the slot machine to turn the virtual reels to produce a new set of game symbols in a virtual slot game.

Figure 8A:
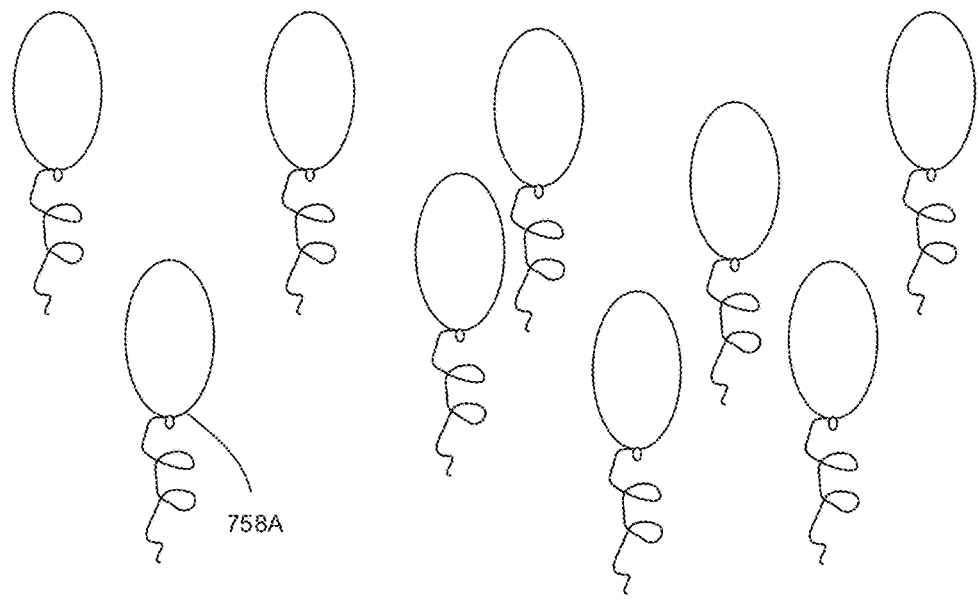
FIGS. 8A and 8B are schematic diagrams that illustrate a mixed reality interface that includes multiple virtual elements that can be selected to produce game elements according to some embodiments.
Figure 8A:
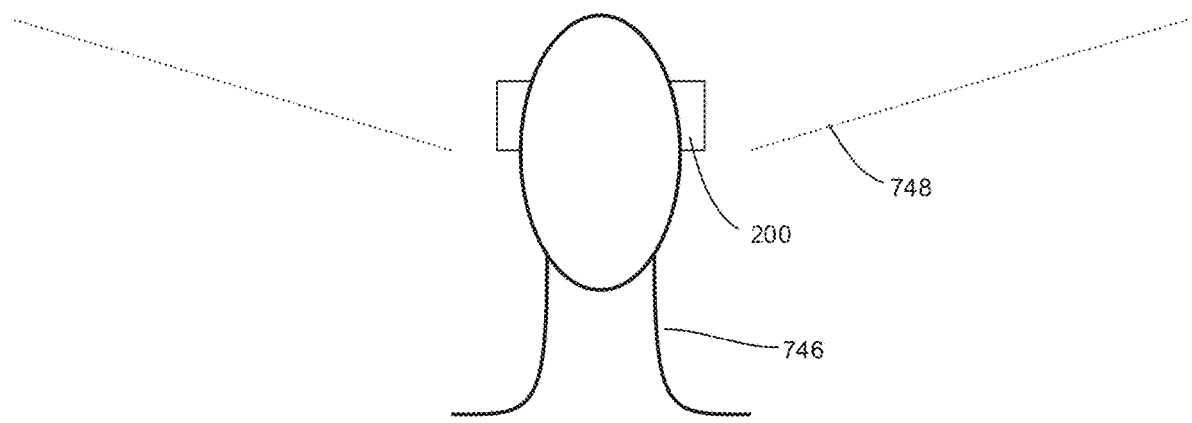
Figure 8B:
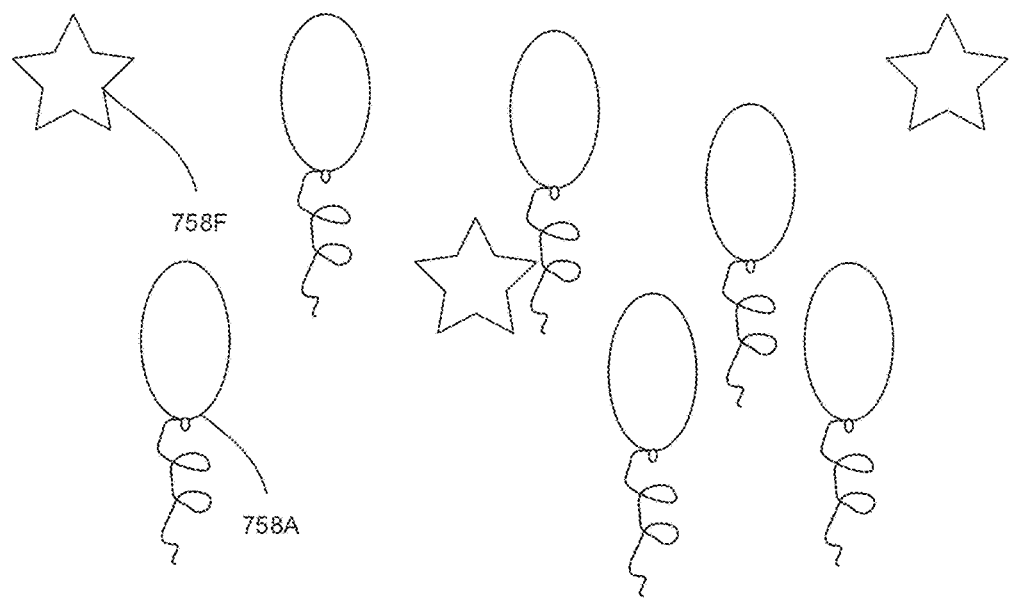
Figure 8B:
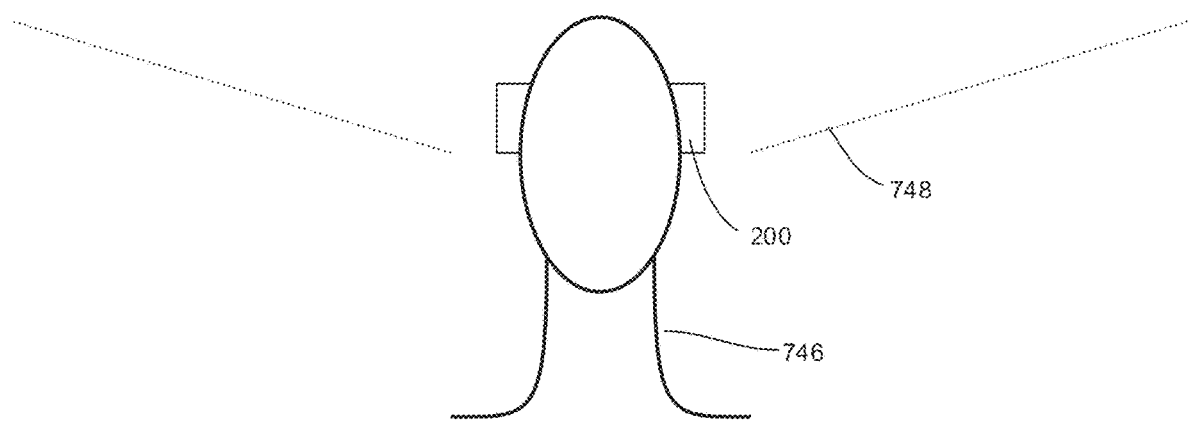

Reference is made to FIGS. 8A and 8B, which are schematic diagrams that illustrate a mixed reality interface that includes multiple virtual elements that can be selected to produce game elements according to some embodiments. Referring to FIG. 8A, the virtual elements 758A may be multiple balloons that are displayed at different locations. The user 746 may select some of the balloons and the action responsive to such selection may cause the balloons to become symbols that correspond to game elements. For example, briefly referring to FIG. 8B, three balloons which have been selected based on receiving the user input and are replaced with virtual elements 758F, which in this example are three stars.

One or more of the virtual elements 758 may be selected based on a user input. In some embodiments, the AR device 200 may include a mobile terminal that includes a touch screen or other graphical pointing technology therein. In such embodiments, the received user input may be generated via user interaction with the touch screen or other graphical pointing technology. In some embodiments, the AR device 200 includes a head mounted display. In such embodiments, the received user input may be generated by a camera in the AR device 200 that captures a user finger or other pointing device in the field of view selecting the virtual element 758. Yet other embodiments may provide that the display includes a pointing or targeting image therein, such as an arrow or cross-hairs. In such embodiments, the received user input may be generated via aiming the pointing or targeting image that is displayed in the AR device 200 at the virtual element 758 and providing another input that indicates that the virtual element 758 is to be selected. The other input may be provided using a button corresponding to the AR device 200, a voice command, a touch screen entry, and/or a selection performed by capturing an image of a pointer, such as a finger.

Figure 9:
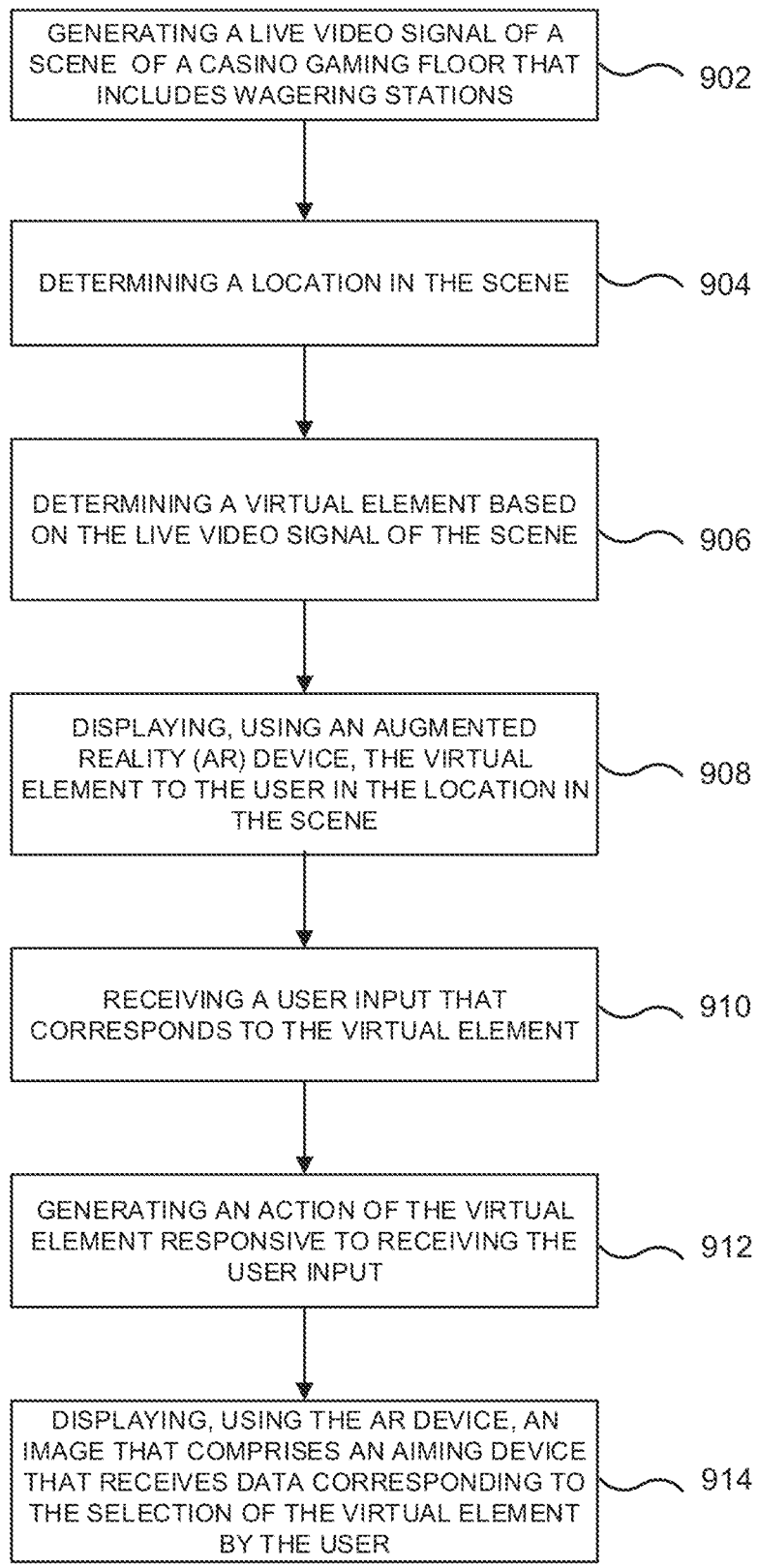
FIG. 9 is a flowchart illustrating operations of systems/methods according to some embodiments.

Reference is now made to FIG. 9, which is a flowchart illustrating operations of systems/methods according to some embodiments. Operations according to some embodiments include generating a live video signal of a scene of a casino floor that includes wagering stations (block 902). The scene may be associated with a field of view of a user. A location in the scene may be determined (block 904). Some embodiments provide that the location corresponds to an EGM that is one the casino floor.

Operations may further include determining a virtual element based on the live video signal of the scene (block 906). In some embodiments, the virtual element includes multiple virtual elements that include hot air water-filled or pressurized balloons, smoke, flames or a fruit tree that includes multiple virtual elements depicted as fruit. Some embodiments provide that the virtual element includes a pile or stack of valuable objects. Examples of such valuable objects includes gold coins, silver coins, gold bars, currency and/or precious gems, among others. Some embodiments include determining multiple locations and that multiple virtual elements may be displayed at the different multiple locations.

The virtual element may be displayed at the location in the scene to the user using an AR device so that the virtual element is in the field of view of the user (block 908). In some embodiments, the virtual element is displayed to the user in the location in the scene for a given time interval. In such embodiments, the virtual element may not be displayed after the given time interval has elapsed. In some embodiments, the virtual element may change from a first virtual element to a second virtual element after the time has elapsed.

Operations may include receiving a user input that corresponds to the virtual element (block 910). Some embodiments provide that the user input is received into the AR device, as a tactile input on an interface portion of the AR device and/or via the live video signal including image data corresponding to a hand position of the user that is visible in the scene. Some embodiments include displaying, using the AR device, an image that includes an aiming device that receives data corresponding to the selection of the virtual element by the user (block 914). Examples of an aiming device may include images of cross-hairs or the like.

An action of the virtual element may be generated responsive to receiving the user input (block 912). The action may include disappearing and/or changing into another virtual element. In some embodiments, the location corresponds to an electronic gaming machine (EGM) that is on the casino gaming floor and generating the action of the virtual element includes causing the virtual element to dynamically change to from a first image to a second image that is different from the first image.

Some embodiments further include providing a player award to the user responsive to receiving the user input that corresponds to the virtual element. In some embodiments, the player award includes credits to play, player points corresponding to a player rewards system and/or a ticket printed with award information, among others. Some embodiments provide that different ones of the multiple virtual elements are associated with different player awards.

In some embodiments, ones of the virtual elements are sequentially displayed to lead the user to different locations in a sequence that is defined by the virtual elements. For example, in response to the user interacting with a first virtual element, a second virtual element may be displayed at another location in the casino that is within the field of view of the user. Similarly, in response to the user interacting with the second virtual element, a third virtual element may be displayed at yet another location in the casino that is in the field of view of the user. In this manner, a user may be led along a route through the casino, collecting awards along the way.

In some embodiments, multiple virtual elements are displayed. The virtual elements may include game elements that correspond to a game or other competition. For example, game elements may include playing cards, gaming machine symbols and/or dice, among others. The user may collect a portion of the displayed game elements and may be awarded a player award that is based on the combination of the game elements. For example, a user may select 5 different playing cards of those displayed. The five different cards may represent a poker hand that has a given value that is based on the strength thereof. In some embodiments, the player may select a portion of the virtual cards in the poker hand to be replaced with other cards in an effort to improve the strength of the poker hand.

Similarly, the virtual elements may include gaming machine reels that the user may select to be stopped to reveal one or more gaming machine symbols. The user may collect a player award based on the combination of the symbols that were selected. Similar games may use rolling dice that may be selected to stop and display a single side of the die. The combination value of the dice may determine the value of a player award that the user receives. In some embodiments, different die combinations may provide bonus points for matching two or more die out of a group of dice.

In some embodiments, the virtual elements may include game elements that correspond to a tournament among two or more players. In such embodiments, during play, certain game elements may be ejected from a part of an EGM and float around the player for the player to select or virtually pop. Some embodiments provide that the virtual elements are provided as a component of the tournament, in a bonus round and/or as a random award during game play.

In some embodiments, determining the location in the scene and determining and the virtual element are performed responsive to a trigger event. Some embodiments provide that trigger event may include an event in which the revenue on the casino floor exceeds a given revenue goal. Some embodiments provide that the event is triggered based on a randomly generated amount of time that has elapsed. In some embodiments, the event is triggered based on receiving an input from a casino operator or after the elapse of a given time interval.

Some embodiments provide that the wagering stations may include an EGM, a position at a live gaming table, and/or any location on the casino floor that provides opportunities for placing a wager. For example, wagering stations may include a sports booking station or area.

Embodiments provided herein may provide improved accessibility to wagering stations by including additional user interface technologies, such as augmented reality. Such embodiments may improve technological efficiency by coordinating the augmented reality with examples of different types of wagering stations.

Figure 10A:
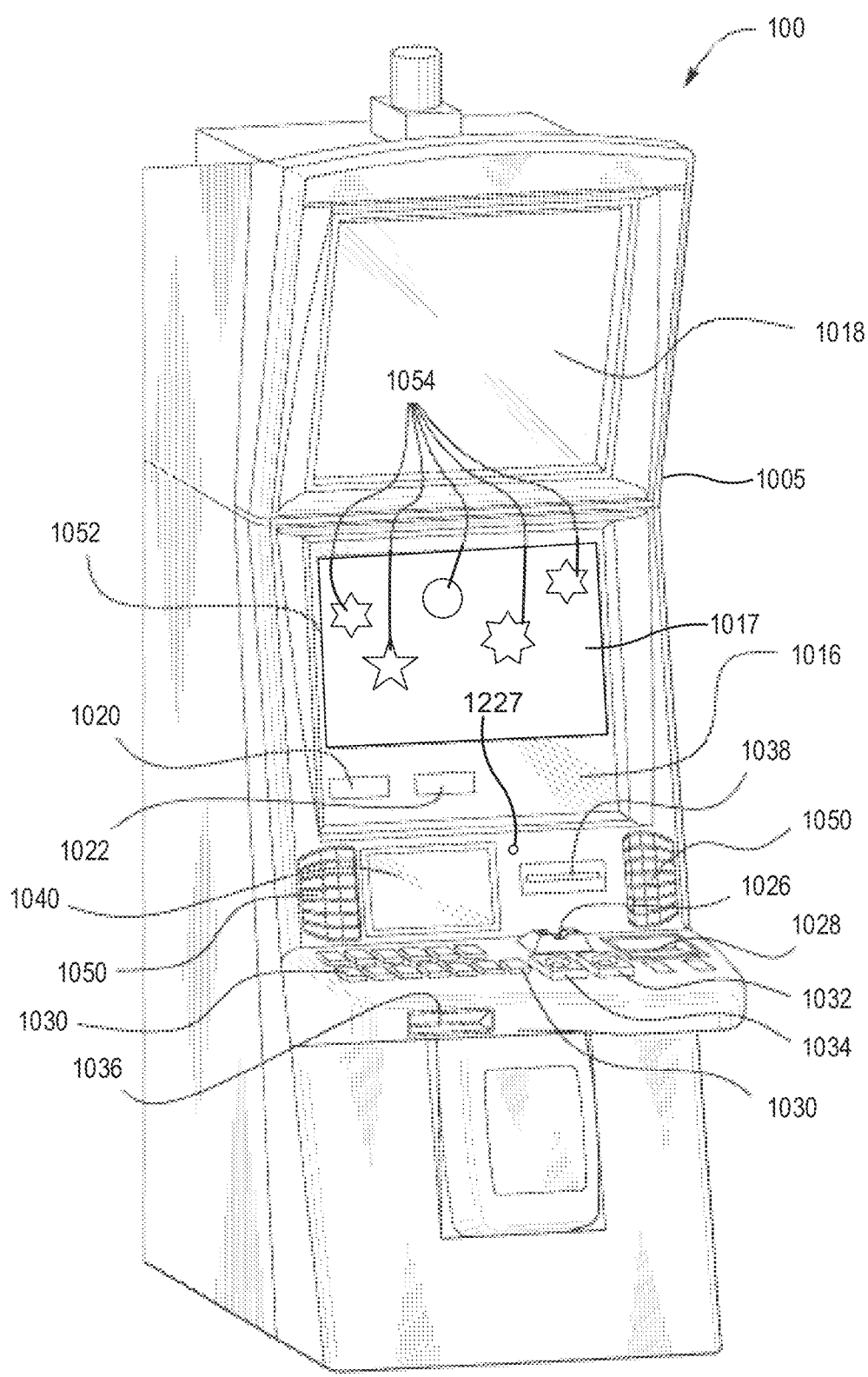
FIG. 10A is a perspective view of an electronic gaming device that can be configured according to some embodiments.
Figure 10B:
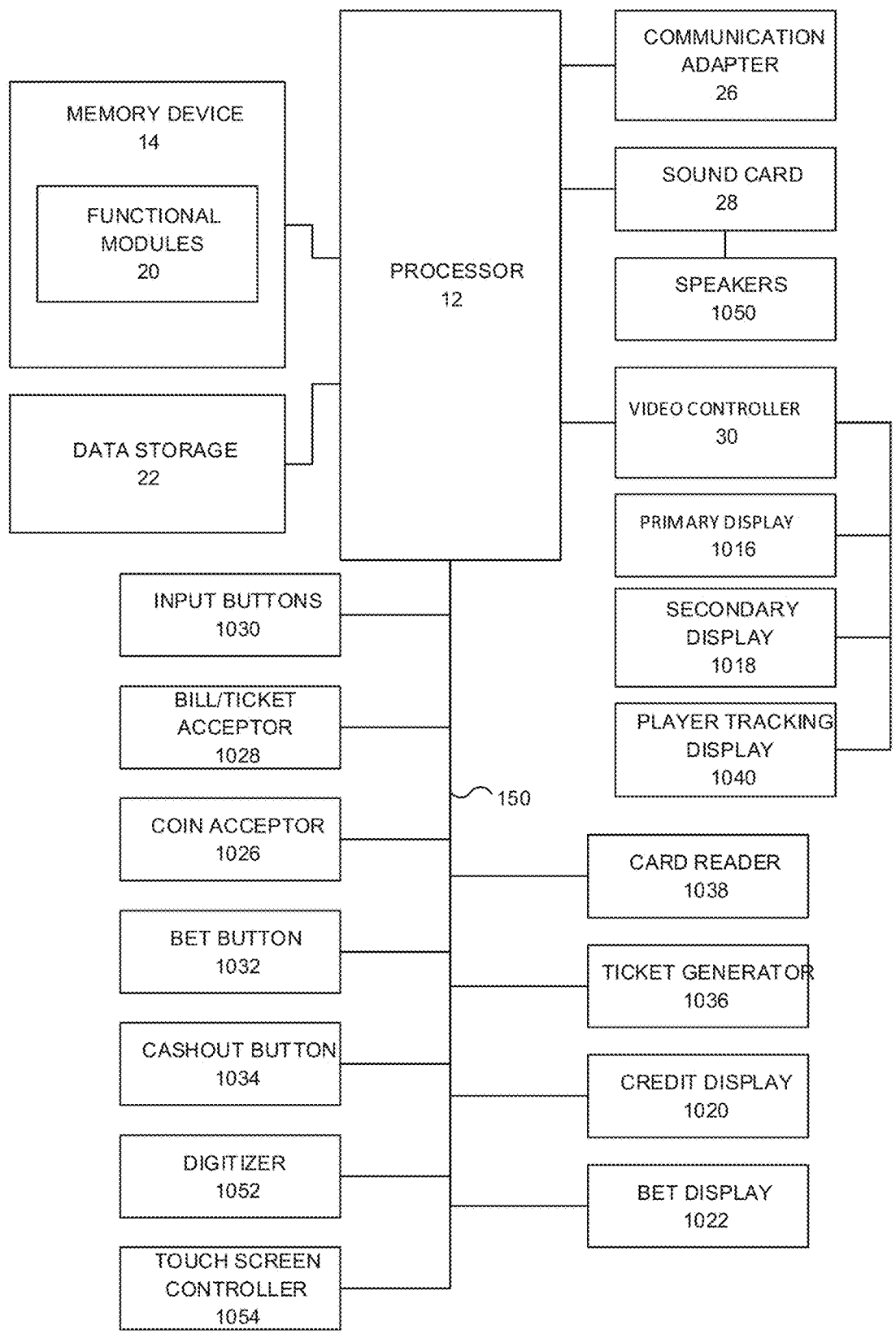
FIG. 10B is a schematic block diagram illustrating an electronic configuration for a gaming device according to some embodiments.
Figure 10C:
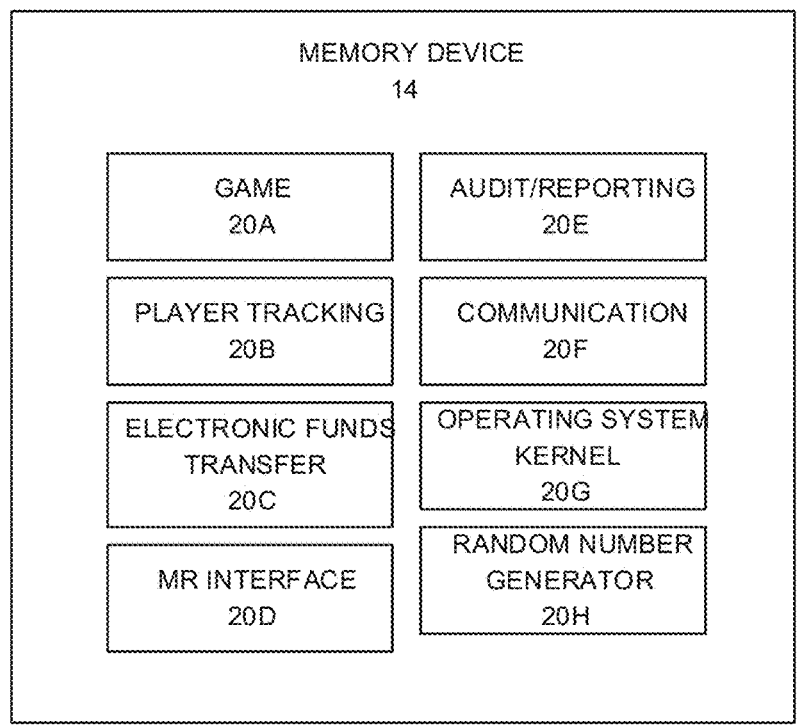
FIG. 10C is a block diagram that illustrates various functional modules of an electronic gaming device according to some embodiments.

In some embodiments, various offers and other virtual elements may be redeemable and/or interactively related to EGMs, other types of gaming machines, or other types of casino games, products, or services. In this regard, an example of an electronic gaming machine (EGM) that can interact with mixed reality viewers according to various embodiments is illustrated in FIGS. 10A, 10B, and 10C in which FIG. 10A is a perspective view of an EGM 100 illustrating various physical features of the device, FIG. 10B is a functional block diagram that schematically illustrates an electronic relationship of various elements of the EGM 100, and FIG. 10C illustrates various functional modules that can be stored in a memory device of the EGM 100. The embodiments shown in FIGS. 10A to 10C are provided as examples for illustrative purposes only. It will be appreciated that EGMs may come in many different shapes, sizes, layouts, form factors, and configurations, and with varying numbers and types of input and output devices, and that embodiments of the inventive concepts are not limited to the particular EGM structures described herein.

EGMs may include a number of standard features, many of which are illustrated in FIGS. 10A and 10B. For example, referring to FIG. 10A, an EGM 100 may include a support structure, housing or cabinet 1005 which provides support for a plurality of displays, inputs, outputs, controls and other features that enable a player to interact with the EGM 100.

The EGM 100 illustrated in FIG. 10A includes a number of display devices, including a primary display device 1016 located in a central portion of the cabinet 1005 and a secondary display device 1018 located in an upper portion of the cabinet 1005. A plurality of game components 155 are displayed on a display screen 1017 of the primary display device 116. It will be appreciated that one or more of the display devices 1016, 1018 may be omitted, or that the display devices 1016, 1018 may be combined into a single display device. The EGM 100 may further include a player tracking display 1040, a credit display 1020, and a bet display 1022. The credit display 1020 displays a player's current number of credits, cash, account balance or the equivalent. The bet display 1022 displays a player's amount wagered.

The player tracking display 1040 may be used to display a service window that allows the player to interact with, for example, their player loyalty account to obtain features, bonuses, comps, etc. In other embodiments, additional display screens may be provided beyond those illustrated in FIG. 10A.

The EGM 100 may further include a number of input devices that allow a player to provide various inputs to the EGM 100, either before, during or after a game has been played. For example, the EGM 100 may include a plurality of input buttons 1030 that allow the player to select options before, during or after game play. The EGM may further include a game play initiation button 1032 and a cashout button 1034. The cashout button 1034 is utilized to receive a cash payment or any other suitable form of payment corresponding to a quantity of remaining credits of a credit display.

In some embodiments, one or more input devices of the EGM 100 are one or more game play activation devices that are each used to initiate a play of a game on the EGM 100 or a sequence of events associated with the EGM 100 following appropriate funding of the EGM 100. The example EGM 100 illustrated in FIGS. 10A and 10B includes a game play activation device in the form of a game play initiation button 1032. It should be appreciated that, in other embodiments, the EGM 100 begins game play automatically upon appropriate funding rather than upon utilization of the game play activation device.

In some embodiments, one or more input devices of the EGM 100 are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In some embodiments, one or more of the display screens may a touch-sensitive display that includes a digitizer 1052 and a touchscreen controller 1054 (FIG. 10B). The player may interact with the EGM 100 by touching virtual buttons on one or more of the display devices 1016, 1018, 1040. Accordingly, any of the above described input devices, such as the input buttons 1030, the game play initiation button 1032 and/or the cashout button 1034 may be provided as virtual buttons on one or more of the display devices 1016, 1018, 1040.

Referring briefly to FIG. 10B, operation of the primary display device 1016, the secondary display device 1018 and the player tracking display 1040 may be controlled by a video controller 30 that receives video data from a processor 12 or directly from a memory device 14 and displays the video data on the display screen. The credit display 1020 and the bet display 1022 are typically implemented as simple LCD or LED displays that display a number of credits available for wagering and a number of credits being wagered on a particular game. Accordingly, the credit display 1020 and the bet display 1022 may be driven directly by the processor 12. In some embodiments however, the credit display 1020 and/or the bet display 1022 may be driven by the video controller 30.

Referring again to FIG. 10A, the display devices 1016, 1018, 1040 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 1016, 1018, 1040 may include a touch-screen with an associated touch-screen controller 1054 and digitizer 1052. The display devices 1016, 1018, 1040 may be of any suitable size, shape, and/or configuration. The display devices 1016, 1018, 1040 may include flat or curved display surfaces.

The display devices 1016, 1018, 1040 and video controller 30 of the EGM 100 are generally configured to display one or more game and/or non-game images, symbols, and indicia. In certain embodiments, the display devices 1016, 1018, 1040 of the EGM 100 are configured to display any suitable visual representation or exhibition of the movement of objects; dynamic lighting; video images; images of people, characters, places, things, and faces of cards; and the like. In certain embodiments, the display devices 1016, 1018, 1040 of the EGM 100 are configured to display one or more virtual reels, one or more virtual wheels, and/or one or more virtual dice. In other embodiments, certain of the displayed images, symbols, and indicia are in mechanical form. That is, in these embodiments, the display device 1016, 1018, 1040 includes any electromechanical device, such as one or more rotatable wheels, one or more reels, and/or one or more dice, configured to display at least one or a plurality of game or other suitable images, symbols, or indicia.

The EGM 100 also includes various features that enable a player to deposit credits in the EGM 100 and withdraw credits from the EGM 100, such as in the form of a payout of winnings, credits, etc. For example, the EGM 100 may include a ticket dispenser 1036, a bill/ticket acceptor 1028, and a coin acceptor 1026 that allows the player to deposit coins into the EGM 100.

While not illustrated in FIG. 10A, the EGM 100 may also include a payment mechanism, which may include a coin and/or bill acceptor, a coin and/or bill dispenser, an electronic card reader including a magnetic and/or chip-based reader, and/or a wireless reader including a near-field communication (NFC), Bluetooth, Wi-Fi, or other type of wireless interface, for example.

The EGM 100 may further include one or more speakers 1050 controlled by one or more sound cards 28 (FIG. 10B). The EGM 100 illustrated in FIG. 10A includes a pair of speakers 1050. In other embodiments, additional speakers, such as surround sound speakers, may be provided within or on the cabinet 1005. Moreover, the EGM 100 may include built-in seating with integrated headrest speakers.

In various embodiments, the EGM 100 may generate dynamic sounds coupled with attractive multimedia images displayed on one or more of the display devices 1016, 1018, 1040 to provide an audio-visual representation or to otherwise display full-motion video with sound to attract players to the EGM 100 and/or to engage the player during gameplay. In certain embodiments, the EGM 100 may display a sequence of audio and/or visual attraction messages during idle periods to attract potential players to the EGM 100. The videos may be customized to provide any appropriate information.

The EGM 100 may further include a card reader 1038 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor determines the amount of funds entered and displays the corresponding amount on the credit or other suitable display as described above.

In some embodiments, the EGM 100 may include an electronic payout device or module configured to fund an electronically recordable identification card or smart card or a bank or other account via an electronic funds transfer to or from the EGM 100.

FIG. 10B is a block diagram that illustrates logical and functional relationships between various components of an EGM 100. As shown in FIG. 10B, the EGM 100 may include a processor 12 that controls operations of the EGM 100. Although illustrated as a single processor, multiple special purpose and/or general purpose processors and/or processor cores may be provided in the EGM 100. For example, the EGM 100 may include one or more of a video processor, a signal processor, a sound processor and/or a communication controller that performs one or more control functions within the EGM 100. The processor 12 may be variously referred to as a "controller," "microcontroller," "microprocessor" or simply a "computer." The processor may further include one or more application-specific integrated circuits (ASICs).

Various components of the EGM 100 are illustrated in FIG. 10B as being connected to the processor 12. It will be appreciated that the components may be connected to the processor 12 through a system bus, a communication bus and controller, such as a USB controller and USB bus, a network interface, or any other suitable type of connection.

The EGM 100 further includes a memory device 14 that stores one or more functional modules 20. Various functional modules 20 of the EGM 100 will be described in more detail below in connection with FIG. 10D.

The memory device 14 may store program code and instructions, executable by the processor 12, to control the EGM 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferro-electric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The EGM 100 may further include a data storage device 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The EGM 100 may include a communication adapter 26 that enables the EGM 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the EGM 100 to communicate, for example, with a mobile communication device operated by a player.

The EGM 100 may include one or more internal or external communication ports that enable the processor 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor through a universal serial bus (USB) hub (not shown) connected to the processor 12. U.S. Patent Application Publication No. 2004/0254014 describes a variety of EGMs including one or more communication ports that enable the EGMs to communicate and operate with one or more external peripherals.

In some embodiments, the EGM 100 may include a sensor, such as a camera in communication with the processor 12 (and possibly controlled by the processor 12) that is selectively positioned to acquire an image of a player actively using the EGM 100 and/or the surrounding area of the EGM 100. In one embodiment, the camera may be configured to selectively acquire still or moving (e.g., video) images and may be configured to acquire the images in either an analog, digital or other suitable format. The display devices 1216, 1218, 1240 may be configured to display the image acquired by the camera as well as display the visible manifestation of the game in split screen or picture-in-picture fashion. For example, the camera may acquire an image of the player and the processor 12 may incorporate that image into the primary and/or secondary game as a game image, symbol or indicia.

Various functional modules of that may be stored in a memory device 14 of an EGM 100 are illustrated in FIG. 10C. Referring to FIG. 10C, the EGM 100 may include in the memory device 14 a game module 20A that includes program instructions and/or data for operating a hybrid wagering game as described herein. The EGM 100 may further include a player tracking module 20B, an electronic funds transfer module 20C, a wide area progressive module 20D, an audit/reporting module 20E, a communication module 20F, an operating system 20G and a random number generator 20H. The player tracking module 20B keeps track of the play of a player. The electronic funds transfer module 20C communicates with a back end server or financial institution to transfer funds to and from an account associated with the player. The wide area progressive (WAP) interface module 20D interacts with a remote WAP server to enable the EGM 100 to participate in a wide area progressive jackpot game as described in more detail below. The communication module 20F enables the EGM 100 to communicate with remote servers and other EGMs using various secure communication interfaces. The operating system kernel 20G controls the overall operation of the EGM 100, including the loading and operation of other modules. The random number generator 20H generates random or pseudorandom numbers for use in the operation of the hybrid games described herein.

In some embodiments, an EGM 100 comprises a personal device, such as a desktop computer, a laptop computer, a mobile device, a tablet computer or computing device, a personal digital assistant (PDA), or other portable computing devices. In some embodiments, the EGM 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 10D:
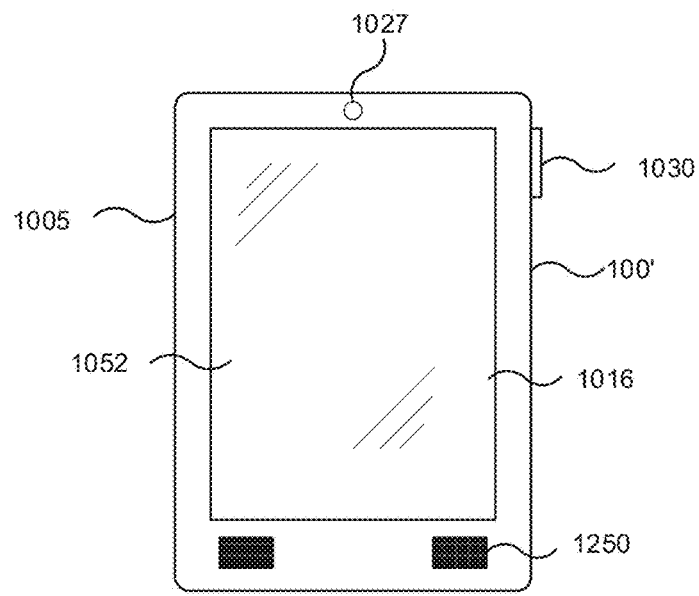
FIG. 10D is perspective view of a handheld electronic gaming device that can be configured according to some embodiments.

For example, referring to FIG. 10D, an EGM 100' may be implemented as a handheld device including a compact housing 1205 on which is mounted a touchscreen display device 1216 including a digitizer 1252. An input button 1230 may be provided on the housing and may act as a power or control button. A camera 1227 may be provided in a front face of the housing 1205. The housing 1205 may include one or more speakers 1250. In the EGM 100', various input buttons described above, such as the cashout button, game-play activation button, etc., may be implemented as soft buttons on the touchscreen display device 1216. Moreover, the EGM 100' may omit certain features, such as a bill acceptor, a ticket generator, a coin acceptor or dispenser, a card reader, secondary displays, a bet display, a credit display, etc. Credits can be deposited in or transferred from the EGM 100' electronically.

Figure 10E:
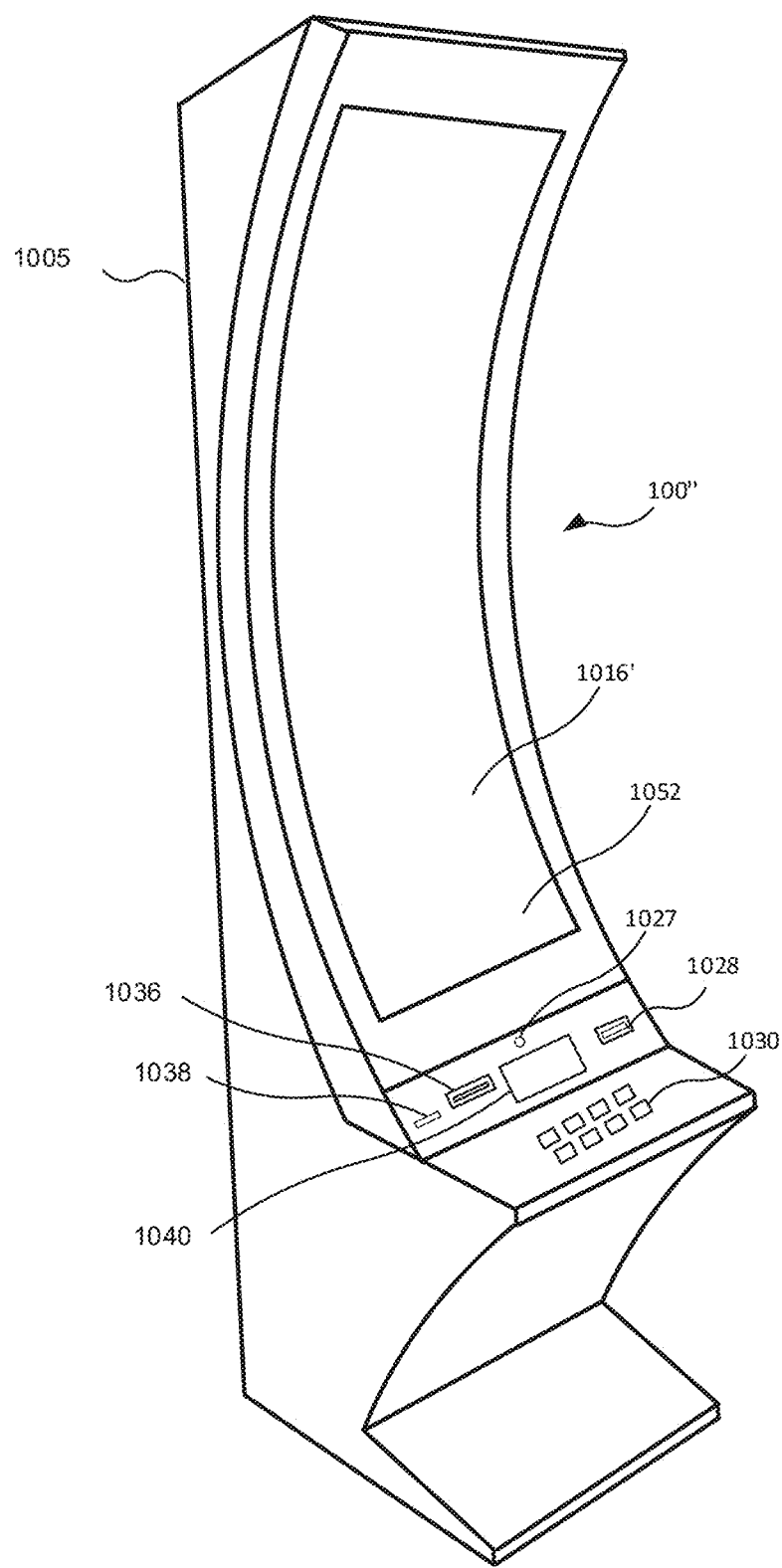
FIG. 10E is a perspective view of an electronic gaming device according to further embodiments.

FIG. 10E illustrates a standalone EGM 100" having a different form factor from the EGM 100 illustrated in FIG. 10A. In particular, the EGM 100" is characterized by having a large, high aspect ratio, curved primary display device 1216' provided in the housing 1205, with no secondary display device. The primary display device 1216' may include a digitizer 1252 to allow touchscreen interaction with the primary display device 1216'. The EGM 1200" may further include a player tracking display 1240, a plurality of input buttons 1230, a bill/ticket acceptor 1228, a card reader 1238, and a ticket generator 1236. The EGM 100" may further include one or more cameras 1227 to enable facial recognition and/or motion tracking.

Figure 11:
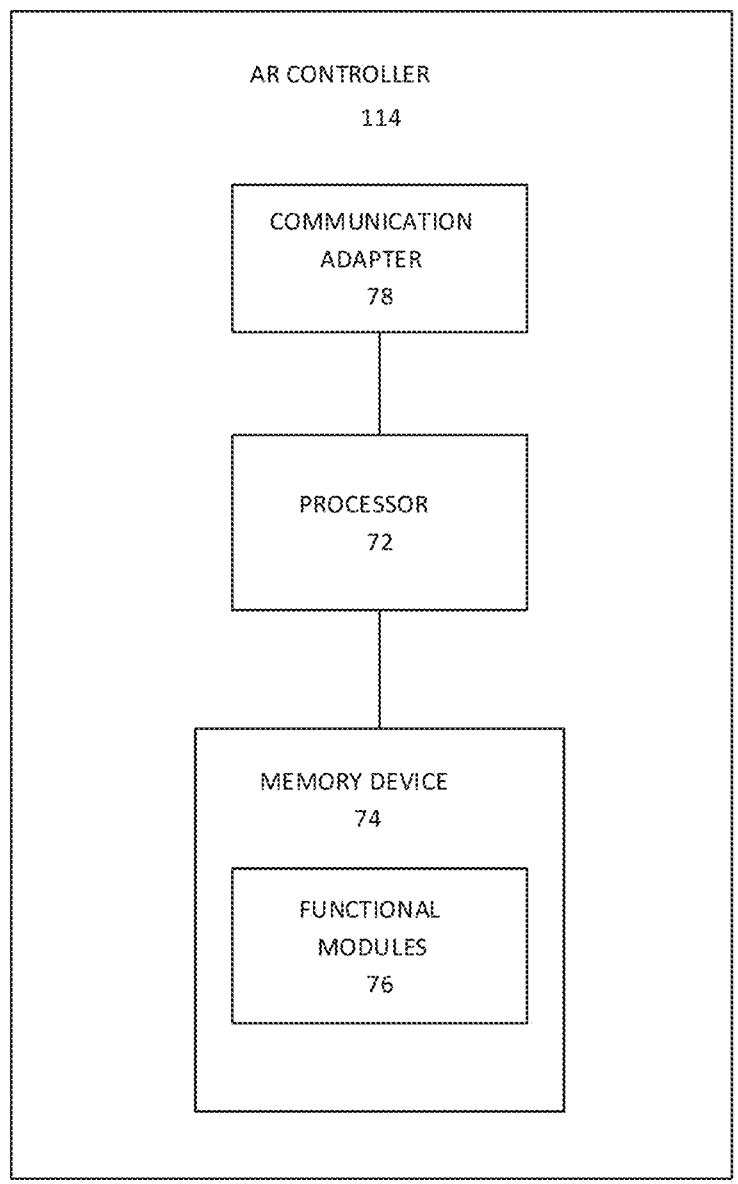
FIG. 11 is a schematic block diagram illustrating an electronic configuration for a mixed reality controller according to some embodiments.

FIG. 11 is a block diagram that illustrates various components of an AR controller 114 according to some embodiment. As shown in FIG. 11, the AR controller 114 may include a processor 72 that controls operations of the AR controller 114. Although illustrated as a single processor, multiple special purpose and/or general purpose processors and/or processor cores may be provided in the AR controller 114. For example, the EGM 100 may include one or more of a video processor, a signal processor, a sound processor and/or a communication controller that performs one or more control functions within the EGM 100. The processor 72 may be variously referred to as a "controller," "microcontroller," "microprocessor" or simply a "computer." The processor may further include one or more application-specific integrated circuits (ASICs).

Various components of the AR controller 114 are illustrated in FIG. 11 as being connected to the processor 72. It will be appreciated that the components may be connected to the processor 72 through a system bus, a communication bus and controller, such as a USB controller and USB bus, a network interface, or any other suitable type of connection.

The AR controller 114 further includes a memory device 74 that stores one or more functional modules 76 for performing the operations described above.

The memory device 74 may store program code and instructions, executable by the processor 72, to control the AR controller 114. The memory device 74 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The AR controller 114 may include a communication adapter 78 that enables the AR controller 114 to communicate with remote devices, such as EGMs 100 and/or a player tracking server 108 (FIG. 1) over a wired and/or wireless communication network, such as a local area network (LAN), wide area network (WAN), cellular communication network, or other data communication network.

In some embodiments, the AR controller 114 may be an AR server 114 that receives a live video signal of a scene associated with fields of view of multiple users. The scene may include a casino gaming floor that includes multiple wagering stations. The AR server 114 may determine a location in the scene and send AR display data to multiple AR devices that each generate AR display content that is viewable by multiple respective users of the AR devices. The AR display content may correspond to AR image content and AR location data.

Each of the AR devices may include a processor circuit, a transceiver that is coupled to the processing circuit, and a display device that is coupled to the processing circuit and that is configured to display the AR content within a field of view of the respective user when the respective user is viewing the location. The AR display content includes multiple virtual elements that are displayed as being at the respective locations of the casino gaming floor.

The AR server 114 further receives, via one of the AR devices, a user input from one of the users that corresponds to one of the virtual elements and that generates an action of the corresponding virtual element responsive to receiving the user input. In some embodiments, different ones of the virtual elements are associated with different player awards.

In some embodiments, the multiple users include a first user and a second user and the location corresponds to a single virtual element. In response to receiving a first user input that corresponds to the first virtual element from the first user before receiving a second user input corresponding to the same virtual element, the AR server awards a player award to the first user and not to the second user.

In some embodiments, the first user and second user are competing with one another in the selection of the virtual elements. For example, if the first user selects more of the virtual elements than the second user within a defined time interval then the first user is awarded a value that corresponds to the different player awards of the virtual elements that he/she selects.

Some embodiments provide that in a competition between the first and second users, an award is based on player award values corresponding to the virtual elements that are selected. For example, if the first user selects virtual elements that have a higher aggregate value than that of the second user then the AR server determines that the first user wins over the second user based on the first player's award value being greater than the second player's award value.

In some embodiments, one or more virtual elements is displayed at a location that corresponds one of the wagering stations. The AR server may award a player award user responsive to the user initiating game play at the wagering station that is identified by the virtual element.

The EGM 100 disclosed herein may include one or more internal or external communication ports that enable the processor 72 to communicate with and to operate with internal or external peripheral devices, such as display screens, keypads, mass storage devices, microphones, speakers, and wireless communication devices. In some embodiments, internal or external peripheral devices may communicate with the processor through a universal serial bus (USB) hub (not shown) connected to the processor 72.

Embodiments described herein may be implemented in various configurations for EGMs 100s, including but not limited to: (1) a dedicated EGM, wherein the computerized instructions for controlling any games (which are provided by the EGM) are provided with the EGM prior to delivery to a gaming establishment; and (2) a changeable EGM, where the computerized instructions for controlling any games (which are provided by the EGM) are downloadable to the EGM through a data network when the EGM is in a gaming establishment. In some embodiments, the computerized instructions for controlling any games are executed by at least one central server, central controller or remote host. In such a "thin client" embodiment, the central server remotely controls any games (or other suitable interfaces) and the EGM is utilized to display such games (or suitable interfaces) and receive one or more inputs or commands from a player. In another embodiment, the computerized instructions for controlling any games are communicated from the central server, central controller or remote host to an EGM local processor and memory devices. In such a "thick client" embodiment, the EGM local processor executes the communicated computerized instructions to control any games (or other suitable interfaces) provided to a player.

In some embodiments, an EGM may be operated by a mobile device, such as a mobile telephone, tablet other mobile computing device.

In some embodiments, one or more EGMs in a gaming system may be thin client EGMs and one or more EGMs in the gaming system may be thick client EGMs. In another embodiment, certain functions of the EGM are implemented in a thin client environment and certain other functions of the EGM are implemented in a thick client environment. In one such embodiment, computerized instructions for controlling any primary games are communicated from the central server to the EGM in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with a machine readable instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The invention claimed is:

1. A computer implemented method comprising:
    determining a location in a scene that is provided in a live video signal and that is associated with a field of view of a user, the scene comprising a casino gaming floor that comprises a plurality of wagering stations;
    determining, based on the live video signal of the scene, a virtual element;
    displaying, using an augmented reality (AR) device, the virtual element to the user in the location in the scene so that the virtual element is in the field of view of the user;
    receiving a user input that corresponds to the virtual element; and
    generating an action of the virtual element responsive to receiving the user input,
    wherein the virtual element comprises a plurality of virtual elements that are displayed at a plurality of locations in the field of view of the user,
    wherein different ones of the plurality of virtual elements are associated with different ones of a plurality of different player awards, and
    wherein displaying the virtual element to the user comprises sequentially displaying a portion of the plurality of virtual elements to lead the user to different ones of the plurality of locations in a sequence that is defined by the ones of the plurality of virtual elements.

2. The method of claim 1, wherein sequentially displaying the portion of the virtual elements comprises:
    displaying a first virtual element of the plurality of virtual elements at a first location of the plurality of locations; and
    responsive to the user interacting with the first virtual element, displaying a second virtual element of the plurality of virtual elements at a second location of the plurality of locations that is different from the first location.

3. The method of claim 1, wherein the plurality of virtual elements comprise hot-air, water-filled or pressurized balloons, flames or a fruit tree that comprises the plurality of virtual elements depicted as fruit, and
wherein generating the action of the virtual element comprises providing a player award of the plurality of different player awards that is associated with the virtual element to the user.

4. A computer implemented method comprising:
determining a location in a scene that is provided in a live video signal and that is associated with a field of view of a user, the scene comprising a casino gaming floor that comprises a plurality of wagering stations;
determining, based on the live video signal of the scene, a virtual element;
displaying, using an augmented reality (AR) device, the virtual element to the user in the location in the scene so that the virtual element is in the field of view of the user;
receiving a user input that corresponds to the virtual element; and
generating an action of the virtual element responsive to receiving the user input,
wherein determining the location in the scene and determining, based on the live video signal of the scene, the virtual element are performed responsive to a trigger event,
wherein the trigger event comprises a floor revenue meeting a given revenue goal, a randomly generated amount of time elapsed, receipt of an input from a casino operator, or the elapse of a given time interval.

5. The computer implemented method of claim 4, wherein the location corresponds to an electronic gaming machine (EGM) that is on the casino gaming floor,
wherein generating the action of the virtual element comprises causing the virtual element to dynamically change from a first image to a second image that is different from the first image, and
the method further comprising providing a player award to the user responsive to receiving the user input that corresponds to the virtual element.

6. The computer implemented method of claim 5, wherein the player award comprises credits to play, player points corresponding to a player rewards system or a ticket printed with award information.

7. The computer implemented method of claim 5, wherein the plurality of virtual elements comprise a plurality of game elements corresponding to a game,
wherein generating the action of the virtual element comprises collecting a portion of the plurality of the game elements, and
wherein providing the player award to the user is based on a combination value corresponding to the portion of the plurality of game elements.

8. The computer implemented method of claim 4, wherein determining the location in the scene comprises determining a plurality of locations,
wherein the plurality of virtual elements are displayed at the plurality of locations.

9. The computer implemented method of claim 8, wherein ones of the plurality of virtual elements are sequentially displayed to lead the user to different ones of the plurality of locations in a sequence that is defined by the ones of the plurality of virtual elements.

10. The computer implemented method of claim 4, wherein receiving the user input that corresponds to the virtual element comprises receiving, into the AR device, tactile input on an interface portion of the AR device or receiving, via the live video signal, image data corresponding to a hand position of the user that is visible in the scene.

11. The computer implemented method of claim 4, further comprising displaying, using the AR device, an image that comprises an aiming device that receives data corresponding to the selection of the virtual element by the user.

12. The computer implemented method of claim 4, wherein displaying the virtual element to the user in the location in the scene so that the virtual element is in the field of view of the user comprises displaying the virtual element for a given time interval, wherein the virtual element is not displayed after the given time interval has elapsed.

13. The computer implemented method of claim 4, wherein displaying the virtual element to the user in the location in the scene so that the virtual element is in the field of view of the user comprises:
displaying the virtual element for a given time interval; and
changing an appearance of the virtual element, wherein the virtual element is not displayed after the given time interval has elapsed.

14. The computer implemented method of claim 4, wherein the plurality of wagering stations comprises one of an electronic game machine (EGM), a live gaming table, and a location on the casino floor that provides opportunities for placing a wager.

15. The computer implemented method of claim 4, wherein the virtual element comprises a pile of a plurality of valuable objects, and
wherein ones of the plurality of valuable objects comprise gold coins, silver coins, gold bars, currency or precious gems.

16. An augmented reality (AR) system comprising:
an AR server that:
receives a live video signal of a scene associated with fields of view of a plurality of users, wherein the scene comprises a casino gaming floor that comprises a plurality of wagering stations;
determines a location in the scene; and
sends AR display data to a plurality of AR devices that each generate AR display content that is viewable by a plurality of respective users of the plurality of AR devices, the AR display content corresponding to AR image content and AR location data, each of the plurality of AR devices comprising:
a processing circuit;
a transceiver coupled to the processing circuit;
a display device coupled to the processing circuit and configured to display the AR display content within a field of view of the respective user when the respective user is viewing the location,
wherein the AR display content comprises a plurality of virtual elements that are displayed as being at respective locations of the casino gaming floor,
wherein the AR server further receives, via one of the plurality of AR devices, a user input from one of the plurality of users that corresponds to one of the plurality of virtual elements and that generates an action of the one of the plurality of virtual elements responsive to receiving the user input,
wherein different ones of the plurality of virtual elements are associated with different ones of a plurality of different player awards, and wherein the location in the scene is determined responsive to a trigger event that comprises receipt of an input from a casino operator.

17. The AR system of claim 16, wherein the plurality of users comprises a first user and a second user, wherein the location corresponds to a first virtual element of the plurality of virtual elements, and wherein responsive to receiving a first user input that corresponds to the first virtual element from the first user before receiving a second user input that corresponds to the first virtual element, the AR server awards a first player award of the plurality of different player awards to the first user and not to the second user.

18. The AR system of claim 16, wherein the plurality of users comprises a first user and a second user that is competing with the first user regarding selecting ones of the plurality of virtual elements, wherein the first user selects more of the plurality of virtual elements than the second user within a defined time interval, and wherein based on the first user selecting more of the plurality of virtual elements than the second user, the first user is awarded a value that corresponds to the ones of the plurality of different player awards of the plurality of virtual elements that the first user selects.

19. The AR system of claim 16, wherein the plurality of users comprises a first user and a second user that is competing with the first user regarding selecting ones of the plurality of virtual elements, wherein the first user selects a first portion of the plurality of virtual elements that is associated with a first player award based on player award values of the first portion of the plurality of virtual elements, wherein the second user selects a second portion of the plurality of virtual elements that is associated with a second player award based on player award values of the second portion of the plurality of virtual elements, wherein the first player award is greater than the second player award, and wherein the AR server determines that the first user wins over the second user based on the first player award being greater than the second player award.

20. The AR system of claim 16, wherein one of the plurality of virtual elements is displayed at the location, wherein the location corresponds one of the plurality of wagering stations, and wherein the AR server awards a player award of the plurality of different player awards to the respective user responsive to the respective user initiating game play at the one of the plurality of wagering stations at the location.

* * * * *